United States Patent
Byun et al.

(10) Patent No.: US 10,742,334 B2
(45) Date of Patent: Aug. 11, 2020

(54) METHOD AND APPARATUS FOR MEASURING INTER-RU INTERFERENCE IN ORDER TO PERFORM SPACE DIVISION DUPLEX COMMUNICATION

(71) Applicant: LG Electronics Inc., Seoul (KR)

(72) Inventors: Ilmu Byun, Seoul (KR); Jiwon Kang, Seoul (KR); Heejin Kim, Seoul (KR); Heejeong Cho, Seoul (KR); Genebeck Hahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/341,235

(22) PCT Filed: Jul. 19, 2017

(86) PCT No.: PCT/KR2017/007788
§ 371 (c)(1),
(2) Date: Apr. 11, 2019

(87) PCT Pub. No.: WO2018/074708
PCT Pub. Date: Apr. 26, 2018

(65) Prior Publication Data
US 2019/0260485 A1    Aug. 22, 2019

Related U.S. Application Data

(60) Provisional application No. 62/411,682, filed on Oct. 23, 2016, provisional application No. 62/411,683, (Continued)

(51) Int. Cl.
*H04W 4/00*    (2018.01)
*H04B 17/336*  (2015.01)
(Continued)

(52) U.S. Cl.
CPC ......... *H04B 17/336* (2015.01); *H04B 7/0404* (2013.01); *H04B 7/0617* (2013.01);
(Continued)

(58) Field of Classification Search
None
See application file for complete search history.

(56) References Cited

U.S. PATENT DOCUMENTS

2013/0089009 A1* 4/2013 Li ....................... H04L 27/2601
370/278
2013/0114468 A1* 5/2013 Hui ....................... H01Q 3/2611
370/277

(Continued)

FOREIGN PATENT DOCUMENTS

WO    2015-048678    4/2015

OTHER PUBLICATIONS

Ericsson, "Antenna Pattern at UE/RSU in NR eV2X," R1-1609703, 3GPP TSG RAN WG1 Meeting #86bis, Lisbon, Portugal, Sep. 30, 2016, see sections 2, 3.

*Primary Examiner* — Clemence S Han
(74) *Attorney, Agent, or Firm* — Dentons US LLP

(57) ABSTRACT

Provided are a method and an apparatus for measuring inter-RU interference in order to perform space division duplex communication in a wireless communication system. Specifically, a terminal acquires first interference information indicating the strength of inter-RU interference after analog interference cancellation, and second interference information indicating the strength of inter-RU interference before analog interference cancellation. The terminal determines whether space division duplex communication can be performed between RUs, by comparing the interference strength indicated by the first interference information with a first threshold. The terminal determines whether inter-RU interference needs to be periodically measured, by compar- (Continued)

ing the interference strength indicated by the second interference information with a second threshold.

18 Claims, 27 Drawing Sheets

Related U.S. Application Data filed on Oct. 23, 2016, provisional application No. 62/439,052, filed on Dec. 25, 2016.

(51) Int. Cl.
| | |
|---|---|
| *H04B 17/24* | (2015.01) |
| *H04W 4/40* | (2018.01) |
| *H04W 76/27* | (2018.01) |
| *H04B 7/0404* | (2017.01) |
| *H04B 7/06* | (2006.01) |
| *H04W 24/10* | (2009.01) |
| *H04W 88/02* | (2009.01) |
| *H04L 25/02* | (2006.01) |
| *H04B 17/345* | (2015.01) |

(52) U.S. Cl.
CPC ........... *H04B 17/24* (2015.01); *H04B 17/345* (2015.01); *H04L 25/02* (2013.01); *H04W 4/40* (2018.02); *H04W 24/10* (2013.01); *H04W 76/27* (2018.02); *H04W 88/023* (2013.01)

(56) References Cited

U.S. PATENT DOCUMENTS

| | | | |
|---|---|---|---|
| 2013/0309975 A1* | 11/2013 | Kpodzo | H04B 1/1027 455/63.1 |
| 2016/0081091 A1* | 3/2016 | Kim | H04L 5/14 370/276 |
| 2016/0226653 A1* | 8/2016 | Bharadia | H04B 1/525 |
| 2016/0269061 A1* | 9/2016 | Hwang | H04B 1/1036 |
| 2016/0285486 A1* | 9/2016 | Qin | H04B 1/1027 |
| 2017/0104576 A1* | 4/2017 | Liu | H04B 1/525 |
| 2017/0293025 A1* | 10/2017 | Davis | G01S 7/023 |
| 2017/0293027 A1* | 10/2017 | Stark | G01S 13/878 |
| 2018/0006690 A1* | 1/2018 | Shepard | H04B 7/0617 |
| 2018/0083679 A1* | 3/2018 | Lim | H04B 17/336 |
| 2018/0213538 A1* | 7/2018 | Na | H04B 17/11 |

\* cited by examiner

■ : RU

■ : RU

Time 1

Time 2

FIG. 22

Time 1  Time 2

| 0 | 0 |
| 1 | 1 |
| 2 | 2 |
| 2 | 2 |

☐ 0 : RS 0

☐ 1 : RS 1

▨ 2 ▨ : RS 2

Time 1

Time 2

◯ : RU group

Reference line of azimuth angle

METHOD AND APPARATUS FOR MEASURING INTER-RU INTERFERENCE IN ORDER TO PERFORM SPACE DIVISION DUPLEX COMMUNICATION

CROSS-REFERENCE TO RELATED APPLICATIONS

This application is the National Stage filing under 35 U.S.C. 371 of International Application No. PCT/KR2017/007788, filed on Jul. 19, 2017, which claims the benefit of U.S. Provisional Applications No. 62/411,682 filed on Oct. 23, 2016, No. 62/411,683 filed on Oct. 23, 2016, and No. 62/439,052 filed on Dec. 25, 2016, the contents of which are all hereby incorporated by reference herein in their entirety.

BACKGROUND OF THE INVENTION

Field of the Invention

The present invention relates to wireless communication and, more specifically, to a method and apparatus for measuring inter-RU interference in order to perform space division duplex communication in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

LTE-based vehicle-to-everything (V2X) is urgently desired from market requirement as widely deployed LTE-based network provides the opportunity for the vehicle industry to realize the concept of 'connected cars'. The market for vehicle-to-vehicle (V2V) communication in particular is time sensitive because related activities such as research projects, field test, and regulatory work are already ongoing or expected to start in some countries or regions such as US, Europe, Japan, Korea, and China.

3GPP is actively conducting study and specification work on LTE-based V2X in order to respond to this situation. In LTE-based V2X, PC5-based V2V has been given highest priority. It is feasible to support V2V services based on LTE PC5 interface with necessary enhancements such as LTE sidelink resource allocation, physical layer structure, and synchronization. In the meantime, V2V operation scenarios based on not only LTE PC5 interface but also LTE Uu interface or a combination of Uu and PC5 has been considered. The maximum efficiency of V2V services may be achieved by selecting/switching the operation scenario properly.

Early completion of the corresponding radio access network (RAN) specification for PC5-based V2V and integration with Uu interface will enable fast preparation for device and network implementation, thereby allowing more chance for LTE-based V2V in the market. In addition, it can provide the basis for other V2X services, especially vehicle-to-infrastructure/network (V2I/N) and vehicle-to-pedestrian (V2P) services, so that RAN support for all the V2X services can be completed in time.

SUMMARY OF THE INVENTION

The present description provides a method and apparatus for measuring inter-RU interference in order to perform space division duplex communication in a wireless communication system.

The present description proposes a method and apparatus for measuring inter-RU interference in order to perform space division duplex communication.

The apparatus includes a radio frequency (RF) unit for transmitting and receiving RF signals and a processor connected to the RF unit.

First, terms are arranged. A UE has a plurality of radio units (RUs) and an RU may correspond to an antenna port. In the present embodiment, space division duplex communication may correspond to communication through which one RU receives a signal and another RU transmits a signal or communication through which one RU transmits a signal and another RU receives a signal.

A UE may receive a first threshold value and a second threshold value from an eNB. The first threshold value and the second threshold value may be broadcast or transmitted through a radio resource control (RRC) message.

The UE may receive information on allocation of resources for periodically measuring inter-RU interference from the eNB. Accordingly, the UE can measure inter-RU interference to generate interference information.

The UE acquires first interference information indicating the strength of inter-RU interference after analog interference cancellation and second interference information indicating the strength of inter-RU interference before analog interference cancellation.

The UE compares the first interference information with the first threshold value and compares the second interference information with the second threshold value.

Specifically, the UE determines that space division duplex communication between RUs cannot be performed if the strength of interference indicated by the first interference information is greater than the first threshold value. The UE determines that space division duplex communication between RUs can be performed if the strength of interference indicated by the first interference information is equal to or less than the first threshold value.

When it is determined that space division duplex communication between RUs can be performed, the UE periodically measures inter-RU interference for performing space division duplex communication between RUs if the strength of interference indicated by the second interference information is greater than the second threshold value. The UE does not periodically measure inter-RU interference for performing space division duplex communication between RUs if the strength of interference indicated by the second interference information is equal to or less than the second threshold value.

That is, the UE determines whether space division duplex communication between RUs can be performed through the value of the first interference information and determines the necessity of periodic inter-RU interference measurement through the value of the second interference information.

The UE may transmit the first interference information and the second interference information to the eNB. If the UE has N RUs, the UE needs to transmit interference information about a total of N(N−1)/2 RU pairs, requiring a large number of bits. If p bits are required for each piece of interference information, a total of N(N−1)p bits are necessary.

Accordingly, the UE may transmit information representing whether the strength of interference indicated by the first interference information is greater than the first threshold value and whether the strength of interference indicated by the second interference information is greater than the second threshold value to the eNB. Here, only 1-bit information is required for each RU pair, and thus the information can be transmitted using only N(N−1) bits. The UE can perform the procedure by selecting one of the aforementioned two techniques.

In addition, in the present embodiment, channel estimation can be performed in simultaneous consideration of inter-RU self-interference in a UE and a signal transmitted by an eNB. Hereinafter, inter-RU interference and inter-RU self-interference will be interchangeably described.

The UE may receive a reference signal for channel estimation between the UE and the eNB.

The UE may transmit information about an RU group which transmits a reference signal for periodically measuring inter-RU interference to the eNB.

Here, the reference signal for periodically measuring the inter-RU interference may be transmitted by some RUs. The reference signal for channel estimation between the UE and the eNB may be received by some other RUs. The reference signal for periodically measuring the inter-RU interference and the reference signal for performing channel estimation with respect to the eNB may be orthogonal to each other.

If the strength of inter-RU long-term interference included in the RU group information is equal to or less than the second threshold value, the UE may transmit the strength of the inter-RU long-term interference included in the RU group information to the eNB. On the other hand, if the strength of the inter-RU long-term interference included in the RU group information is greater than the second threshold value, the UE may not transmit the strength of the inter-RU long-term interference included in the RU group information to the eNB.

That is, space division duplex communication between RUs included in the RU group information may be performed if the strength of the inter-RU long-term interference included in the RU group information is transmitted to the eNB. Space division duplex communication between RUs included in the RU group information may not be performed if the strength of the inter-RU long-term interference included in the RU group information is not transmitted to the eNB. That is, the eNB determines that space division duplex communication cannot be performed for an RU pair in the RU group from which information on the strength of long-term interference is not transmitted.

Further, if the strength of the inter-RU long-term interference included in the RU group information is transmitted to the eNB, a modulation scheme, a channel code rate and resource allocation for transmitting signals using an RU included in the RU group information may be determined on the basis of the strength of the inter-RU long-term interference included in the RU group information.

When the proposed technique is used, a UE having a plurality of RUs can transmit a signal through an RU while receiving a signal through a specific RU. When this operation is possible, the UE can complete communication with neighbor UEs within a short time. In addition, signaling overhead between a UE and an eNB can be reduced by efficiently configuring information on interference between RUs.

BRIEF DESCRIPTION OF THE DRAWINGS

FIG. 22 shows another example of the method of transmitting a reference signal according to an embodiment of the present description.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the 3GPP LTE/LTE-A. However, technical features of the present invention are not limited thereto.

Figure 1:
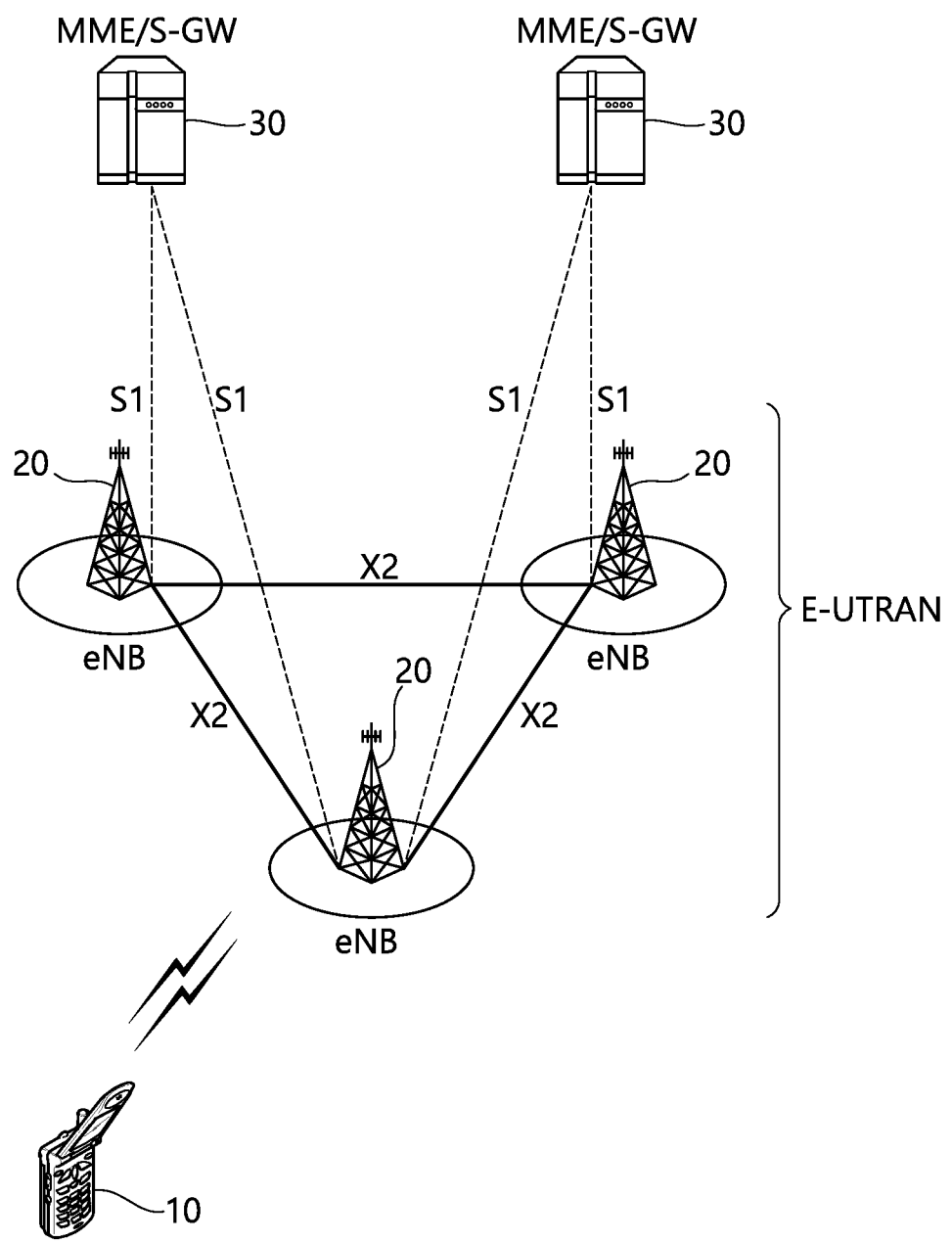
FIG. 1 illustrates a wireless communication system to which the present specification is applied.

FIG. 1 illustrates a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface between the UE and the BS is called a Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
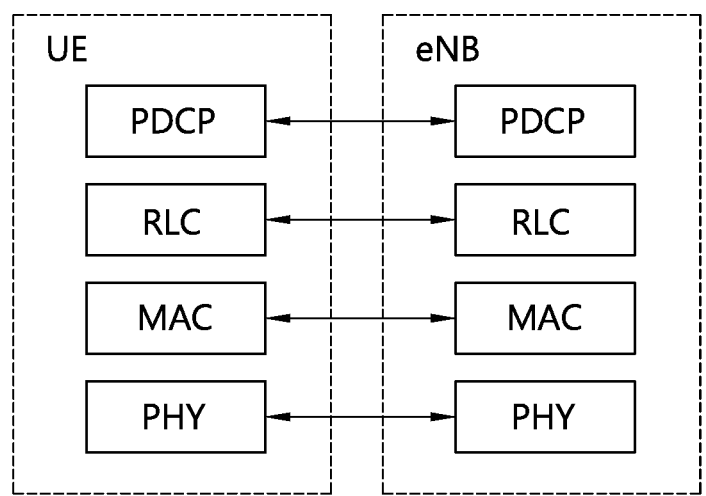
FIG. 2 is a block diagram illustrating a radio protocol architecture for a user plane.
Figure 3:
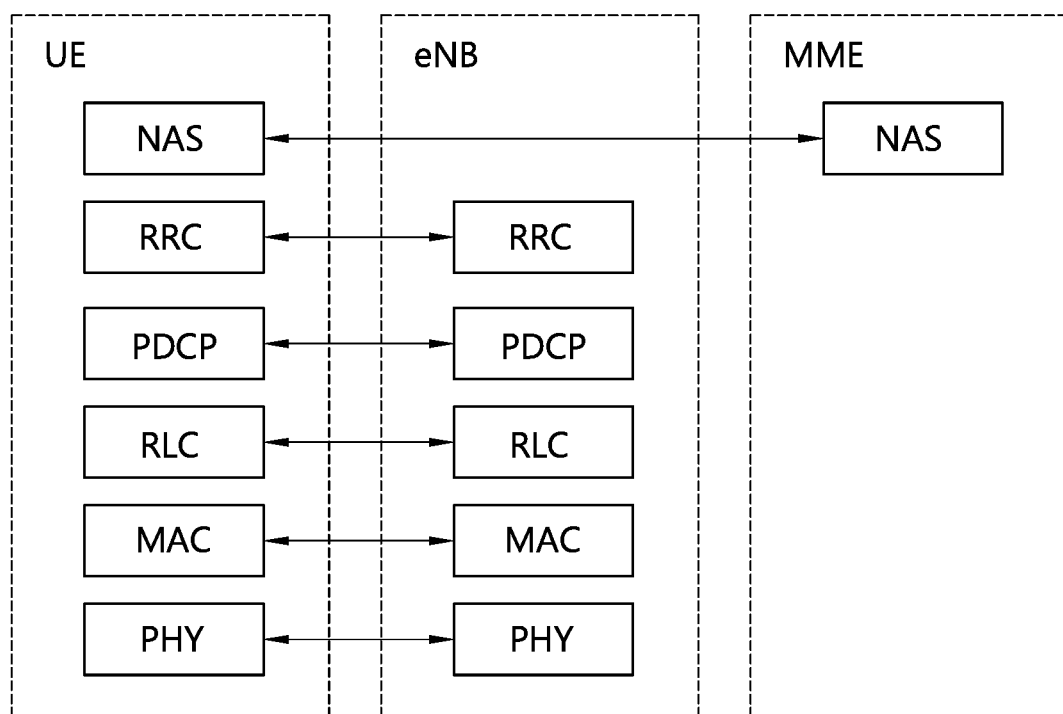
FIG. 3 is a block diagram illustrating a radio protocol architecture for a control plane.

FIG. 2 is a block diagram illustrating a radio protocol architecture for a user plane. FIG. 3 is a block diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs).

An RB is a logical path provided by the first layer (i.e., the PHY layer) and the second layer (i.e., the MAC layer, the RLC layer, and the PDCP layer) for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state, and otherwise the UE is in an RRC idle state.

Data is transmitted from the network to the UE through a downlink transport channel Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Hereinafter, a sidelink is described. The sidelink is an interface between UEs for sidelink communication and sidelink direct discovery. The sidelink corresponds to a PC5 interface. The side link communication is AS functionality enabling proximity-based services (ProSe) direct communication between two or more nearby UEs by using an E-UTRAN technique but not traversing any network node. The sidelink discovery is AS functionality enabling ProSe direct discovery between two or more nearby UEs by using the E-UTRA technique but not traversing any network node. The sidelink uses a UL resource and physical channel structure similarly to UL transmission. Sidelink transmission uses the same basic transmission scheme as the UL transmission scheme. However, the sidelink is limited to single cluster transmission for all sidelink physical channels. In addition, the sidelink uses a gap of one symbol at an end of each sidelink subframe.

Figure 4:
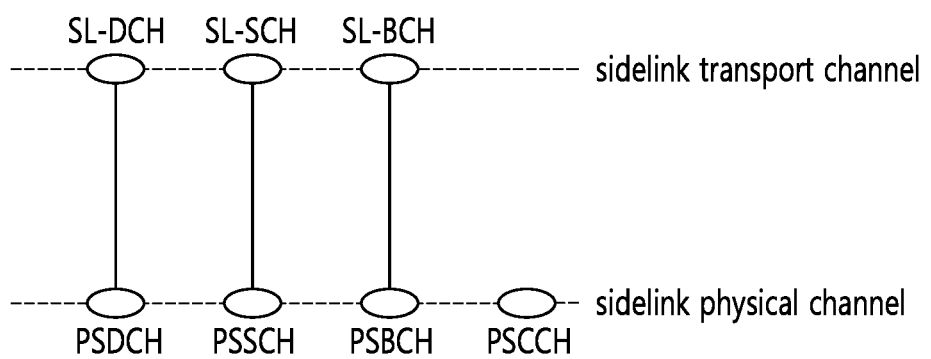
FIG. 4 shows mapping between sidelink transport channels and sidelink physical channels.

FIG. 4 shows mapping between sidelink transport channels and sidelink physical channels. Referring to FIG. 4, a physical sidelink discovery channel (PSDCH) carrying sidelink discovery message from the UE is mapped to a sidelink discovery channel (SL-DCH). A physical sidelink shared channel (PSSCH) carrying data from a UE for sidelink communication is mapped to a sidelink shared channel (SL-SCH). A physical sidelink broadcast channel (PSBCH) carrying system and synchronization related information, transmitted from the UE, is mapped to a sidelink broadcast channel (SL-BCH). A physical sidelink control channel (PSCCH) carries control from a UE for sidelink communication.

Figure 5:
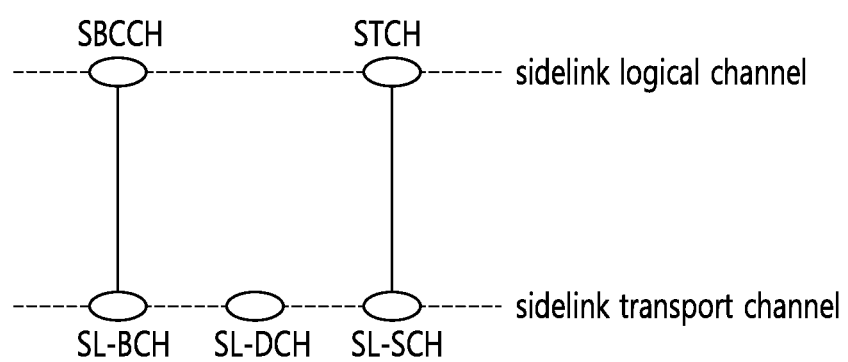
FIG. 5 shows mapping between sidelink logical channels and Sidelink transport channels.

FIG. 5 shows mapping between sidelink logical channels and Sidelink transport channels. Referring to FIG. 5, SL-BCH is mapped to a sidelink broadcast control channel (SBCCH). The SBCCH is a sidelink channel for broadcasting sidelink system information from one UE to other UE(s). This channel is used only by sidelink communication capable UEs. SL-SCH is mapped to a sidelink traffic channel (STCH). The STCH is a point-to-multipoint channel, for transfer of user information from one UE to other UEs. This channel is used only by sidelink communication capable UEs.

Sidelink communication is a mode of communication whereby UEs can communicate with each other directly over the PC5 interface. This communication mode is supported when the UE is served by E-UTRAN and when the UE is outside of E-UTRA coverage. Only those UEs authorized to be used for public safety operation can perform sidelink communication.

In order to perform synchronization for out of coverage operation, UE(s) may act as a synchronization source by transmitting SBCCH and a synchronization signal. SBCCH carries the most essential system information needed to receive other sidelink channels and signals. SBCCH along with a synchronization signal is transmitted with a fixed periodicity of 40 ms. When the UE is in network coverage, the contents of SBCCH are derived from the parameters signaled by the eNB. When the UE is out of coverage, if the UE selects another UE as a synchronization reference, then the content of SBCCH is derived from the received SBCCH. Otherwise, UE uses pre-configured parameters. System information block type-18 (SIB18) provides the resource information for synchronization signal and SBCCH transmission. There are two pre-configured subframes every 40 ms for out of coverage operation. UE receives synchronization signal and SBCCH in one subframe and transmit synchronization signal and SBCCH on another subframe if UE becomes synchronization source based on defined criterion.

UE performs sidelink communication on subframes defined over the duration of sidelink control period. The sidelink control period is the period over which resources allocated in a cell for sidelink control information and sidelink data transmissions occur. Within the sidelink control period, the UE sends sidelink control information followed by sidelink data. Sidelink control information indicates a Layer 1 ID and characteristics of the transmissions (e.g. MCS, location of the resource(s) over the duration of sidelink control period, timing alignment).

The UE performs transmission and reception over Uu and PC5 with the following decreasing priority order:
Uu transmission/reception (highest priority);
PC5 sidelink communication transmission/reception;
PC5 sidelink discovery announcement/monitoring (lowest priority).

The UE supporting sidelink communication can operate in two modes for resource allocation. The first mode is a scheduled resource allocation. The scheduled resource allocation may be referred to as Mode 1. In Mode 1, the UE needs to be RRC_CONNECTED in order to transmit data. The UE requests transmission resources from the eNB. The eNB schedules transmission resources for transmission of sidelink control information and data. The UE sends a scheduling request (dedicated scheduling request (D-SR) or random access) to the eNB followed by a sidelink buffer status report (BSR). Based on the sidelink BSR, the eNB can determine that the UE has data for a sidelink communication transmission and estimate the resources needed for transmission. The eNB can schedule transmission resources for sidelink communication using configured sidelink radio network temporary identity (SL-RNTI).

The second mode is a UE autonomous resource selection. The UE autonomous resource selection may be referred to as Mode 2. In Mode 2, a UE on its own selects resources from resource pools and performs transport format selection to transmit sidelink control information and data. There can be up to 8 transmission pools either pre-configured for out of coverage operation or provided by RRC signalling for in-coverage operation. Each pool can have one or more ProSe per-packet-priority (PPPP) associated with it. For transmission of a MAC protocol data unit (PDU), UE selects a transmission pool in which one of the associated PPPP is equal to the PPPP of a logical channel with highest PPPP among the logical channel identified in the MAC PDU. There is one to one association between sidelink control pool and sidelink data pool. Once the resource pool is selected, the selection is valid for the entire sidelink control period. After the sidelink control period is finished, the UE may perform resource pool selection again.

A set of transmission and reception resource pools for sidelink control information when the UE is out of coverage for sidelink communication is pre-configured in the UE. The resource pools for sidelink control information when the UE is in coverage for sidelink communication are configured as below. The resource pools used for reception are configured by the eNB via RRC, in broadcast signaling. The resource pool used for transmission is configured by the eNB via RRC, in dedicated or broadcast signaling, if Mode 2 is used, and the resource pool used for transmission is configured by the eNB via RRC, in dedicated signaling if Mode 1 is used. The eNB schedules the specific resource(s) for sidelink control information transmission within the configured reception pools.

A set of transmission and reception resource pools for data when the UE is out of coverage for sidelink communication is pre-configured in the UE. The resource pools for data when the UE is in coverage for sidelink communication are configured as below. The resource pools used for transmission and reception are configured by the eNB via RRC, in dedicated or broadcast signaling, if Mode 2 is used. There is no resource pool for transmission and reception if Mode 1 is used.

Sidelink discovery is defined as the procedure used by the UE supporting sidelink discovery to discover other UE(s) in its proximity, using E-UTRA direct radio signals via PC5. Sidelink discovery is supported both when UE is served by EUTRAN and when UE is out of EUTRA coverage. Only ProSe-enabled public safety UE can perform sidelink discovery when it is out of EUTRA coverage. For public safety sidelink discovery, the allowed frequency is pre-configured in the UE, and is used even when UE is out of coverage of EUTRA in that frequency. The pre-configured frequency is the same frequency as the public safety ProSe carrier.

In order to perform synchronization, UE(s) participating in announcing of discovery messages may act as a synchronization source by transmitting a synchronization signal based on the resource information for synchronization signals provided in SIB19.

There are two types of resource allocation for discovery message announcement. The first type is UE autonomous resource selection which is a resource allocation procedure where resources for announcing of discovery message are allocated on a non UE specific basis. The UE autonomous resource selection may be referred to as Type 1. In Type 1, the eNB provides the UE(s) with the resource pool configuration used for announcing of discovery message. The configuration may be signaled in broadcast or dedicated signaling. The UE autonomously selects radio resource(s) from the indicated resource pool and announces discovery message. The UE can announce discovery message on a randomly selected discovery resource during each discovery period.

The second type is scheduled resource allocation which is a resource allocation procedure where resources for announcing of discovery message are allocated on per UE specific basis. The scheduled resource allocation may be referred to as Type 2. In Type 2, the UE in RRC_CONNECTED may request resource(s) for announcing of discovery message from the eNB via RRC. The eNB assigns resource(s) via RRC. The resources are allocated within the resource pool that is configured in UEs for announcement.

For UEs in RRC_IDLE, the eNB may select one of the following options. The eNB may provide a resource pool for UE autonomous resource selection based discovery message announcement in SIB19. UEs that are authorized for sidelink discovery use these resources for announcing discovery message in RRC_IDLE. Or, the eNB may indicate in SIB19 that it supports sidelink discovery but does not provide resources for discovery message announcement. UEs need to enter RRC_CONNECTED in order to request resources for discovery message announcement.

For UEs in RRC_CONNECTED, a UE authorized to perform sidelink discovery announcement indicates to the eNB that it wants to perform sidelink discovery announcement. UE can also indicate to the eNB, the frequency(s) in which sidelink discovery announcement is desired. The eNB validates whether the UE is authorized for sidelink discovery announcement using the UE context received from MME. The eNB may configure the UE with resource pool for UE autonomous resource selection for discovery message announcement via dedicated signaling. The eNB may configure resource pool along with dedicated resource in the form of time and frequency indices for discovery message announcement via dedicated RRC signaling. The resources allocated by the eNB via dedicated signaling are valid until the eNB re-configures the resource(s) by RRC signaling or the UE enters RRC_IDLE.

Authorized receiving UEs in RRC_IDLE and RRC_CONNECTED monitor resource pools used for UE autonomous resource selection and resource pools for scheduled resource allocation. The eNB provides the resource pool configuration used for discovery message monitoring on intra frequency, inter frequency of same or different PLMNs cells in RRC signaling (SIB19 or dedicated). The RRC signaling (SIB19 or dedicated) may contain detailed sidelink discovery configuration used for announcement of sidelink discovering in cells of intra-frequency, inter-frequency of same or different PLMNs.

Vehicle-to-everything (V2X) communication is described. V2X communication contains the three different types, i.e. vehicle-to-vehicle (V2V) communications, vehicle-to-infrastructure (V2I) communications, and vehicle-to-pedestrian (V2P) communications. These three types of V2X can use "co-operative awareness" to provide more intelligent services for end-users. This means that transport entities, such as vehicles, road side unit (RSU), and pedestrians, can collect knowledge of their local environment (e.g. information received from other vehicles or sensor equipment in proximity) to process and share that knowledge in order to provide more intelligent services, such as cooperative collision warning or autonomous driving.

V2X service is a type of communication service that involves a transmitting or receiving UE using V2V application via 3GPP transport. Based on the other party involved in the communication, it can be further divided into V2V service, V2I service, V2P service, and vehicle-to-network (V2N) service. V2V service is a type of V2X service, where both parties of the communication are UEs using V2V application. V2I service is a type of V2X service, where one party is a UE and the other party is an RSU both using V2I application. The RSU is an entity supporting V2I service that can transmit to, and receive from a UE using V2I application. RSU is implemented in an eNB or a stationary UE. V2P service is a type of V2X service, where both parties of the communication are UEs using V2P application. V2N service is a type of V2X service, where one party is a UE and the other party is a serving entity, both using V2N applications and communicating with each other via LTE network entities.

In V2V, E-UTRAN allows such UEs that are in proximity of each other to exchange V2V-related information using E-UTRA(N) when permission, authorization and proximity criteria are fulfilled. The proximity criteria can be configured by the mobile network operator (MNO). However, UEs supporting V2V service can exchange such information when served by or not served by E-UTRAN which supports V2X service. The UE supporting V2V applications transmits application layer information (e.g. about its location, dynamics, and attributes as part of the V2V service). The V2V payload must be flexible in order to accommodate different information contents, and the information can be transmitted periodically according to a configuration provided by the MNO. V2V is predominantly broadcast-based. V2V includes the exchange of V2V-related application information between distinct UEs directly and/or, due to the limited direct communication range of V2V, the exchange of V2V-related application information between distinct UEs via infrastructure supporting V2X Service, e.g., RSU, application server, etc.

In V2I, the UE supporting V2I applications sends application layer information to RSU. RSU sends application layer information to a group of UEs or a UE supporting V2I applications.

In V2P, E-UTRAN allows such UEs that are in proximity of each other to exchange V2P-related information using E-UTRAN when permission, authorization and proximity criteria are fulfilled. The proximity criteria can be configured by the MNO. However, UEs supporting V2P service can exchange such information even when not served by E-UTRAN which supports V2X service. The UE supporting V2P applications transmits application layer information. Such information can be broadcast by a vehicle with UE supporting V2X Service (e.g. warning to pedestrian), and/or by a pedestrian with UE supporting V2X Service (e.g. warning to vehicle). V2P includes the exchange of V2P-related application information between distinct UEs (one for vehicle and the other for pedestrian) directly and/or, due to the limited direct communication range of V2P, the exchange of V2P-related application information between distinct UEs via infrastructure supporting V2X service, e.g., RSU, application server, etc.

Hereinafter, space division duplex (SDD) for V2X communication is described.

The SDD considered in the present specification is a technique in which each antenna of a UE is subjected to space division to independently operate a communication link of each antenna. In order to independently operate the communication link for each antenna, self-interference between antennas of the UE shall be cancelled, and inter-ference between UEs included in the communication link shall be reduced.

As a technique for cancelling the self-interference between the antennas of the UE, there is a technique of applying analog and digital self-interference cancellation techniques or a technique of reducing the self-interference by securing a distance between the antennas. The latter has a lower complexity than the former and thus is easier to apply to real systems. The latter technique can be applied to a vehicle UE having a larger size than an existing communication UE by securing the distance between the antennas. The inter-cell interference reducing technique of the existing cellular communication system can be applied as a technique for reducing interference between UEs. At present, in cellular communication with a high frequency of at least 6 GHz, since a beam width is small in order to secure a communication distance, it is considered that there is a low probability that beams of adjacent cells overlap to cause interference. In addition, there is a high probability that a signal will is blocked by an object due to linearity of the signal. Since a surface of a vehicle is made of iron and a size thereof is large, there is a high probability that a high-frequency signal of an adjacent UE will be blocked.

Figure 6:
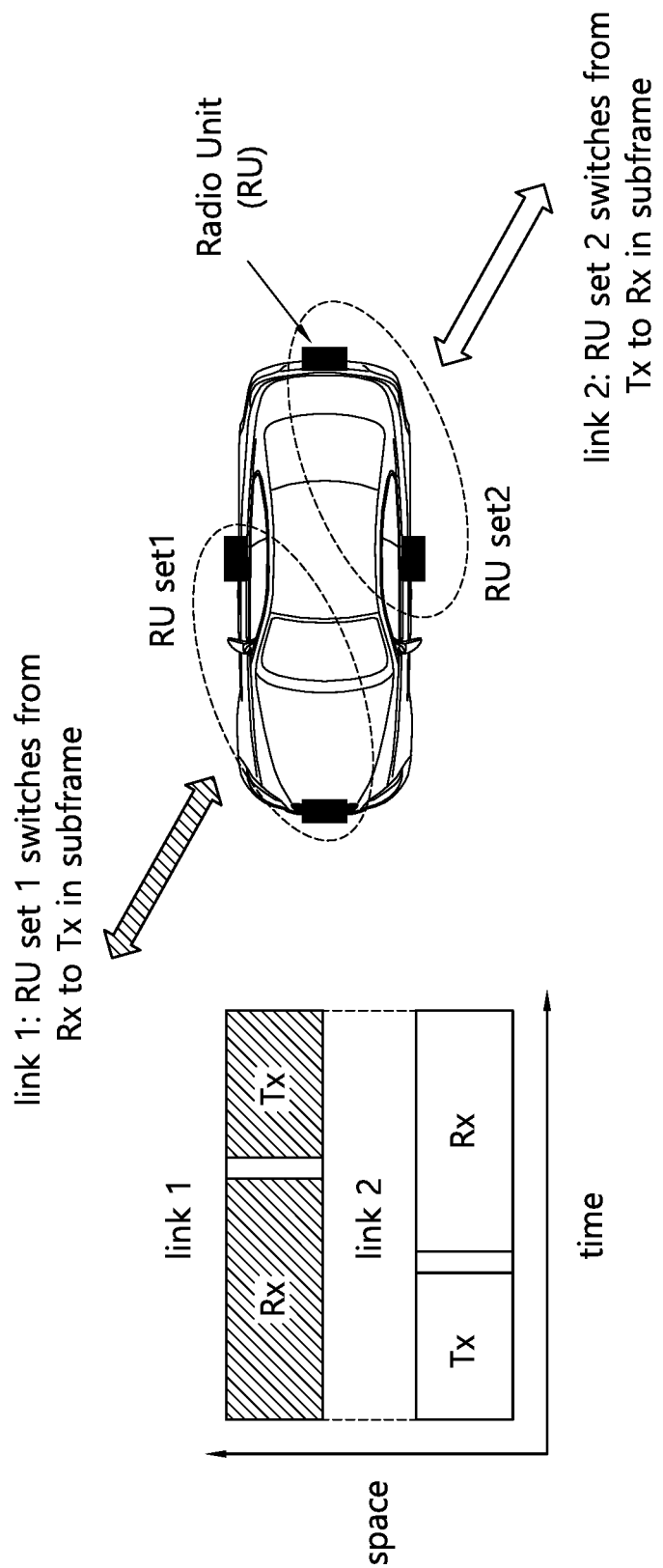
FIG. 6 shows an example of applying space division duplex (SDD) in a vehicle to which distributed antennas are applied.

Due to the above characteristics, space division communication is easy to apply in inter-vehicle high frequency communication with distributed antennas. When the space division communication is applied, since links of the antennas are isolated from each other, it is possible to allocate different transmission/reception points of the respective communication links and reuse frequency resources in each communication link. FIG. 6 is an example of applying space division communication.

FIG. 6 shows an example of applying SDD in a vehicle to which distributed antennas are applied.

In FIG. 6, a link 1 and a link 2 are communication links connected with different devices (UE or BS). According to a situation of each communication link, a transmission (Tx) resource and a reception (Rx) resource may change in amount, and a Tx time point and an Rx time point may change. In the figure above, a radio unit (RU) is an antenna module which aggregates a plurality of antennas. In this case, the UE has 4 RUs in a distributed manner. 2 RUs out of the 4 RUs are used to construct the link 1, and the remaining 2 RUs are used to construct the link 2.

Figure 7:
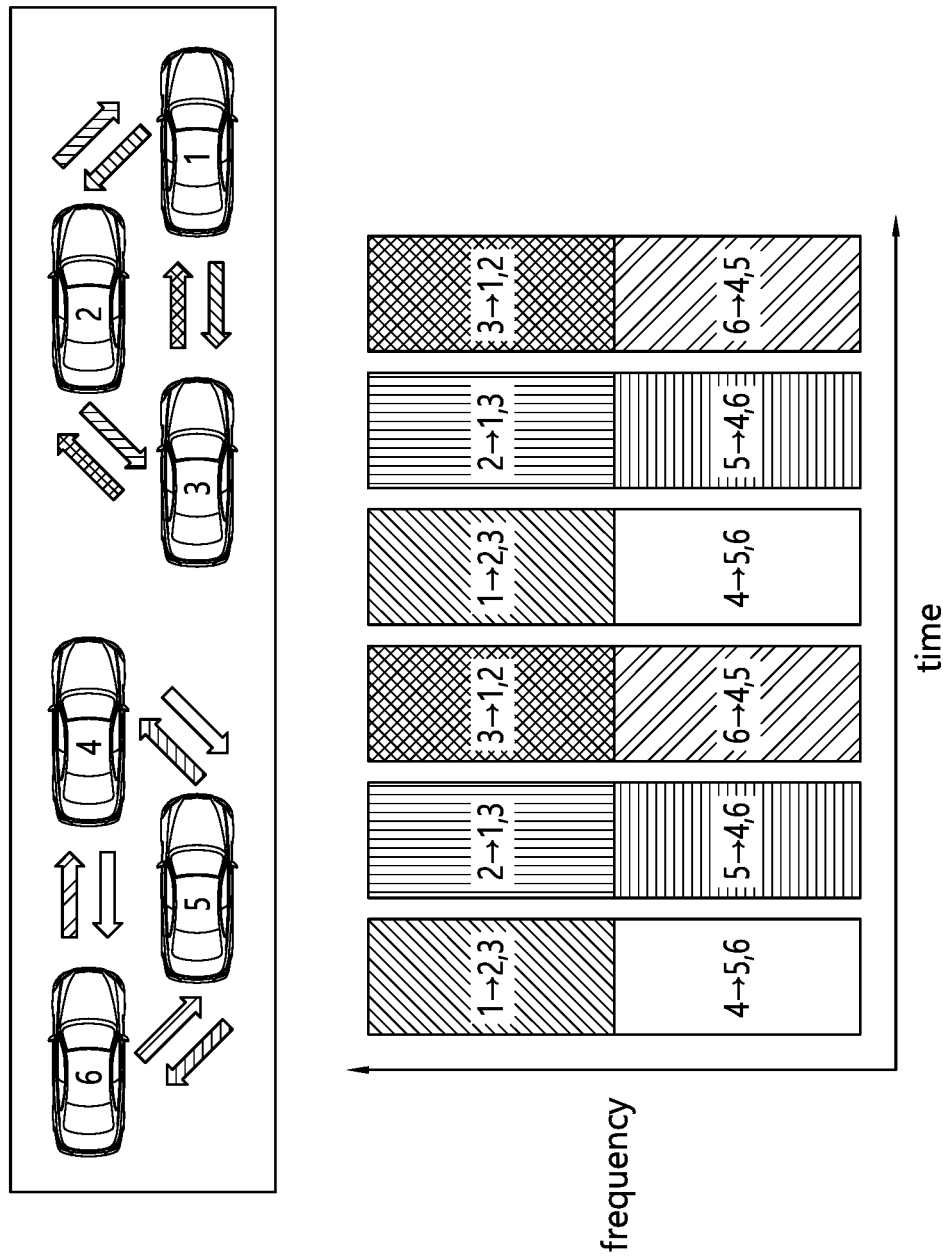
FIG. 7 shows an example of inter-vehicle communication to which SDD is not applied.
Figure 8:
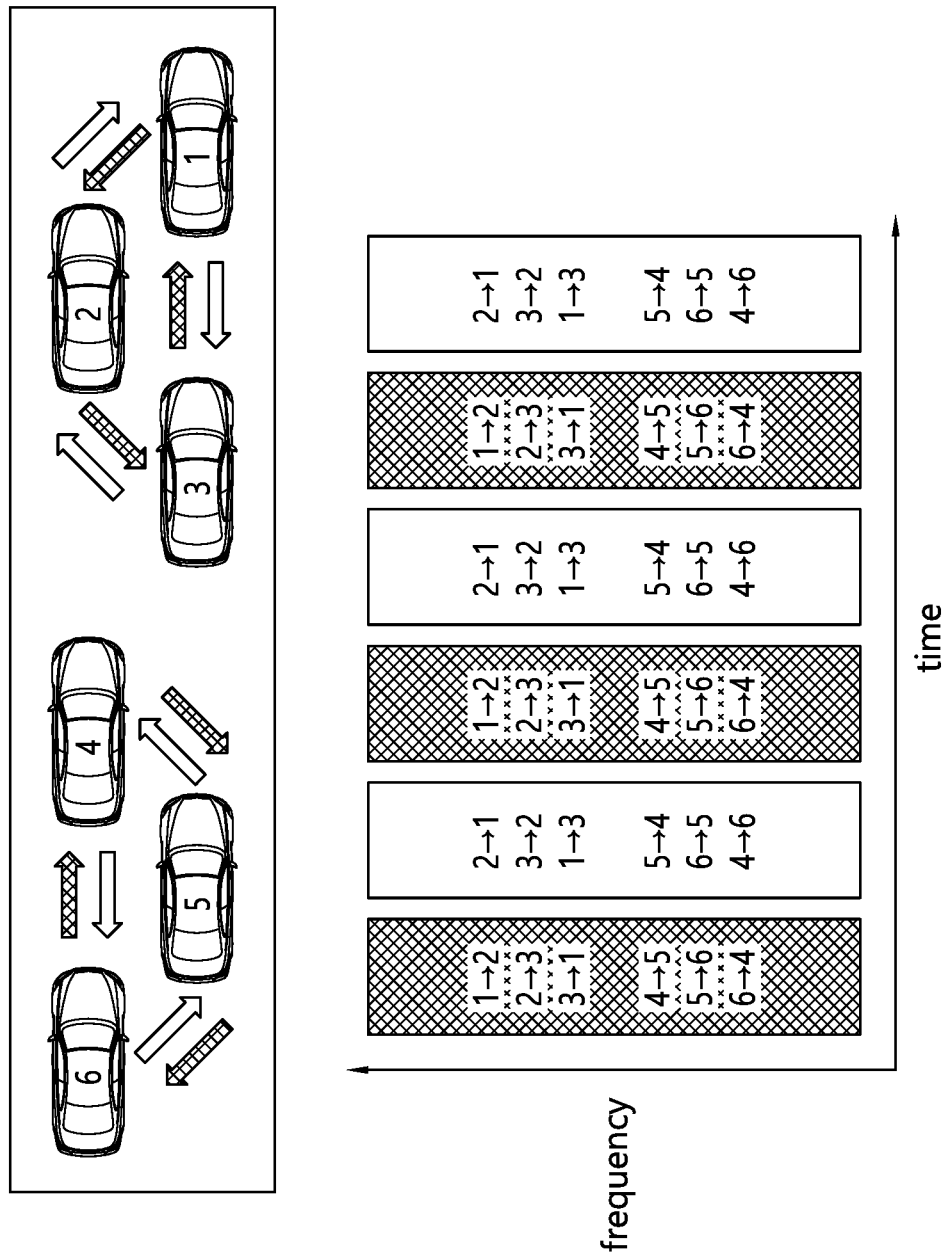
FIG. 8 shows an example of inter-vehicle communication to which SDD is applied.

When the SDD is applied to a plurality of UEs, there is an advantage in that transmission can be performed many times since more resources are used within a target time than the opposite case. FIG. 7 and FIG. 8 are examples of comparing a case of applying SDD and a case of not applying SDD.

FIG. 7 shows an example of inter-vehicle communication to which SDD is not applied. FIG. 8 shows an example of inter-vehicle communication to which SDD is applied.

When the SDD is not applied as shown in FIG. 7, a UE transmits signals simultaneously to different UEs in a multiplexed manner. If three UEs intend to establish a communication link with each adjacent UE as shown in FIG. 7, one transmission resource and two reception resources shall be allocated to each UE.

If the SDD is applied as shown in FIG. 8, since the UE needs to constitute one transmission resource and one reception resource for each communication link, the number of times of performing signal transmission may be greater in a unit time. In case of applying the SDD, a frequency resource allocated to the UE shall be shared with adjacent UEs which simultaneously transmit signals. If the SDD is applied, since a transmission signal of each UE is spatially divided, the same frequency resource can be used, thereby increasing the frequency resource used by each communication link.

In addition to the aforementioned advantage, since a receiving UE of each communication link receives a signal by using a narrow reception beam, a probability of being affected by jamming is decreased. In addition, since there is a high probability that an adjacent vehicle blocks a signal, jamming from a far distance is difficult. There is another advantage in that resource management complexity of a BS is decreased since the BS does not have to perform management so that inter-communication group resource and intra-communication group resource are resources orthogonal to each other. In TR 22.886, a scenario is included in which 15840 vehicles are present per one mile. In this case, complexity of the BS is too increased for the BS to manage each communication link between vehicles. When the SDD is applied, since only a transmission time point and a reception time point are to be determined between UEs included in the communication link, there is an advantage in that the complexity of the BS is decreased.

Hereinafter, a V2X use case for an automated vehicle is described.

<Scenario 1: Overtaking Maneuver Scenario>

Figure 9:
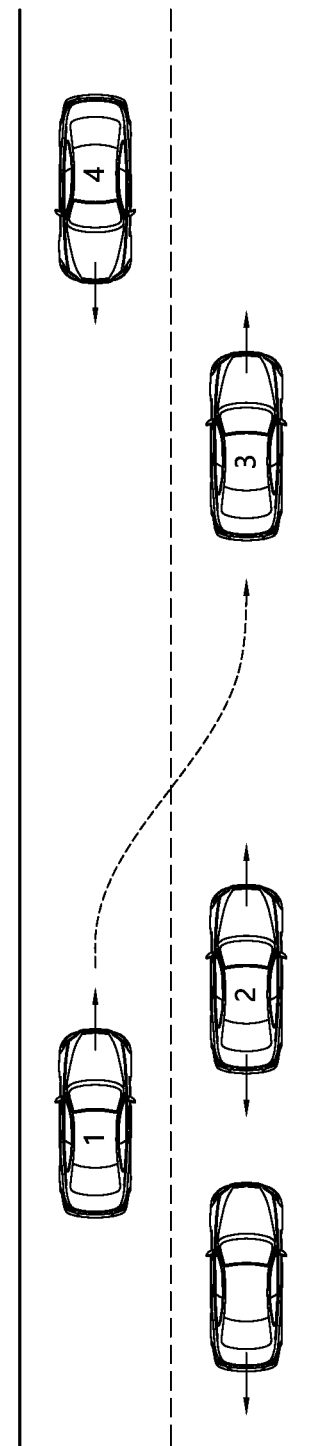
FIG. 9 shows an automated overtaking maneuver scenario in vehicle to everything (V2X) communication for an automated vehicle.

FIG. 9 shows an automated overtaking maneuver scenario in V2X communication for an automated vehicle.

Referring to FIG. 9, an automated vehicle 1 attempts to overtake another vehicle 2. During this attempt, an unpredictable change or deviation from the predicted trajectory may happen. It may come from the change of nearby vehicle's behavior or the appearance of animal and other objects on the road.

An overtaking maneuver has been planned with certain granularity and agreed upon by neighboring vehicles. The accuracy of the overtaking maneuver depends on the granularity (i.e. the size of discrete grid elements) of trajectories. If an unexpected road situation happens, a new joint solution needs to be negotiated quickly to avoid collisions. This needs to be completed before the vehicles enter the next grid element of the trajectory.

A road with a lane of width 3.5 m and a trajectory accuracy of 0.3 m is assumed in the present scenario. It is also assumed that vehicles on the road move with the speed of 30 m/s (108 km/h). In this case, each vehicle is passing a grid element every 10 ms.

If an unexpected road situation happens, a new plan has to be established in order to avoid an accident. A consolidated agreement on road trajectories requires at least three types of messages: a set of offered trajectories from each involved vehicle, an evaluation of all options, and an acknowledgment message. Each communication step needs to be completed within 3.3 ms, neglecting the computational requirements of each step.

<Scenario 2: Cooperative Perception Scenario>

Autonomous driving systems are based on the environmental information obtained via its own sensors. In reality, however, a vehicle cannot obtain the complete scene of the road and surrounding environment because of large trucks or busses blocking its view. Besides this, autonomous vehicles are expected not only to exchange the local awareness information between each other but also to be able to detect numerous features of surrounding environment by means of various sensors and cameras.

Cooperative active safety systems can warn drivers of dangerous situations and intervene through automatic braking or steering if the driver is unable to avoid an accident. Cooperative driving applications, such as platooning (roadtrains) and highly automated driving can reduce travel time, fuel consumption, and CO2 emissions and also increase road safety and traffic efficiency. Moreover, not only cooperation between vehicles or between vehicles and infrastructure is required, but also the cooperation between vehicles and vulnerable road users, e.g. pedestrians and cyclists, through their mobile devices, such as smartphone and tablets, will be an important key element to improve traffic safety. C-ITS systems rely on timely and reliable exchange of information. Common to most applications are real-time requirements, and strict requirements on reliability and availability, especially when considering high mobility and large message sizes.

In addition, in the traffic scenario, the front vehicle could provide the real-time video data to the rear vehicle on as-needed basis in complex driving situation such as an automatic overtaking maneuver. Usual values for commercial video encoders are in the range of 100 ms. Thus, the video is assumed to be transmitted in raw format to avoid encoding and decoding delays and be used in real time for driving purpose. The camera capabilities shall be sufficient for feature extraction suitable for future autonomous driving task. Assuming gray-scale video with a resolution 1280×720 pixels and a refresh state of 30 fps, a data rate of 220 Mbps is required.

In addition, end-to-end latency requirements of less than 5 ms for message sizes of about 1600 bytes need to be guaranteed for all V2X transmissions. Data is sent either event-driven or periodically with a rate of about 10 Hz. Relative speeds of up to 500 km/h are possible on high-speed highways. Periodic broadcast traffic consist of at least 1600 bytes with repetition rate of 1-50 Hz for transmission of information related to objects resulting from local environmental perception and the information related to the actual vehicle.

<Scenario 3: Platooning Scenario with/without Leading Vehicle>

Use case 3-1 (platoon with leading vehicle): Vehicles properly arranged in platoons with enabled automated control of their speed and steering allow to reduce fuel consumption, increase safety, improve road congestion and increase driver convenience. For obtaining true benefit from platooning, each vehicle in platoon must be equipped with certain communication technology to exchange real-time information about a change of platoon's common parameters, such as acceleration, breaking, change of trajectory, etc. Also, the vehicles have to follow each other as near as possible for the improvement of road congestion and optimal fuel consumption, but on the other hand, close spacing leads to higher risk of collision and requires very strict latency and reliability constraints.

Use case 3-2 (platoon without leading vehicle): In a multi-lane convoy use case, a leading vehicle, centralized controller, or supervisor does not exist. Instead, the vehicle control, in both lateral and longitudinal directions, is distributed over all members of the convoy (see FIG. 9). The result of this approach is that vehicle disturbances, such as a braking vehicle, affect all members of the convoy to a greater or lesser extent, resulting in a stable formation.

Figure 10:
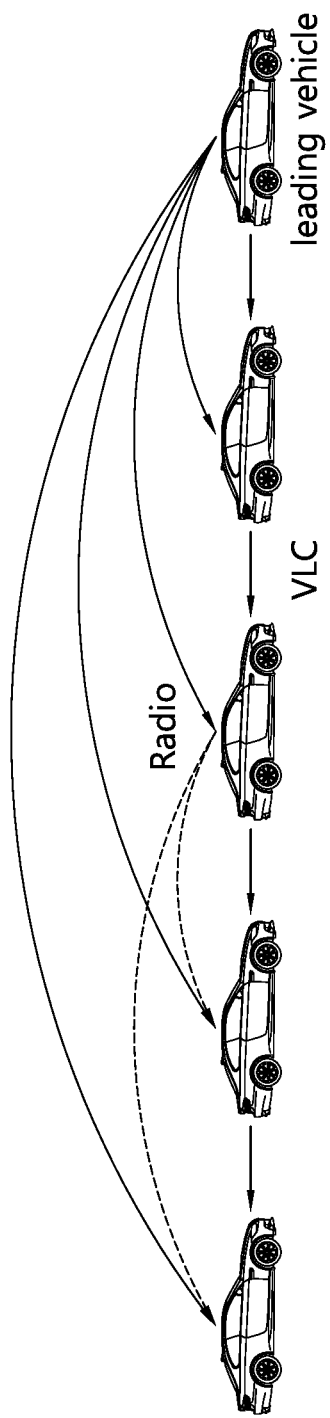
FIG. 10 shows a platoon scenario in V2X communication for an automated vehicle.

FIG. 10 shows a platoon scenario in V2X communication for an automated vehicle.

Scenario 3-1 (braking): It is assumed that each vehicle participated in a platoon has an advanced brake control to compensate for variances in vehicle load, road properties, and the brake system. The brake controller is imperfect so that the imperfection is modelled by additive Gaussian noise of a given variance. The probability of accident is approximately $10^{-6}$ when the variance of the brake controller is $10^{-4}$, vehicles in a platoon moves at speed of 23 m/s, the distance between vehicles is 4.5 m and the packet is successfully delivered at the first transmission. Thus, it can be seen that very low packet error rate (e.g. less than $10^{-6}$) is desirable.

Scenario 3-2 (platoon's common parameter+video data for cooperative perception): The leading vehicle in a platoon transmits platoon's common parameter to the following vehicles via a carrier 1. Also, its video data is delivered with/without platoon's common parameters to the rear vehicles in a multi hop fashion via a carrier 2. Usually, the carrier 2 has much higher frequency than the carrier 1. For example, DSRC and LTE V2V can be used as the carrier 1 and mmWave and visible light communication (VLC) can be used as the carrier 2. The carrier 1 has less propagation loss than the carrier 2 so that the carrier 1 can deliver platoon's common parameter to the last vehicle in the platoon within a short latency. However, the carrier 1 is vulnerable to radio jamming attacks and the areal spectral efficiency and data rate of the carrier 1 are lower than those of the carrier 2.

Scenario 3-3 (platoon without leading vehicle: convoy): In order to maintain small inter-vehicle distances, convoy members rely on the high-frequency exchange of up-to-date and high-quality vehicle dynamics data among vehicles in the convoy. The convoy control algorithm requires just the vehicle dynamics information of neighbor vehicles, instead of the information of all convoy members. As such, the algorithm scales well to large convoys and converges easily to a desired formation when vehicles join and leave the convoy.

Scenario 3-4: In addition to the scenario 2, I2V link or V2I2V link can be used to deliver verified information to vehicles in a platoon. Infrastructures collect information from its sensors and vehicles and forward it to a server. The server filters trumped-up and fabricated information. For example, the server could drop the information collected from vehicles in the black list. The server sends the filtered information to infrastructures and infrastructures forward the filtered information to vehicles in a platoon.

However, there is a possibility of signal blocking according to the aforementioned scenario. Reliability and low-latency of inter-vehicle communication are very important in a service such as a platoon or convoy described in the scenario 3. However, it is expected that a distance between vehicles is at least 4.5 m, and in general, a vehicle interval is set to about 6 to 8 m due to instability of a brake control device, a communication latency, or the like. When the vehicle interval is increased, any vehicle not belonging to the platoon may cut in between platoon groups to overtake. In this case, reliability of communication between platoon groups may deteriorate due to the cut-in vehicle. Summarizing terminologies, the platoon corresponds to a group of vehicles which are driven in a single lane, and autonomous driving is not necessary. The convoy corresponds to a group of vehicles which are driven in several lanes, and is used when the vehicle is automatically driven.

In addition, V2X communication is limited in an LTE system. Since a vehicle may cut in at any section of a platoon in the above scenario, a UE which blocks a signal may be any UE in a communication group. Therefore, in order to solve the aforementioned problem, any UE in a group shall be capable of relaying a signal transmitted by any UE. In the ongoing 3GPP V2X study item, studies are being conducted mainly on periodic signal broadcasting between vehicles, and a problem for the scenario cannot be solved by simply applying a corresponding result.

In addition, communication with low-latency and high-reliability is being proposed as a requirement for 5G V2X. For example, according to 3GPP TR22.886, in case of collective perception, it is necessary to transmit data to a vehicle in the range of 200 m with reliability of 99.999% within 3 ms, and in case of emergence trajectory, it is required to transmit data to a vehicle in the range of 500 m with reliability of 99.999% within 3 ms.

When the information is transmitted to the vehicle in the range of 500 m, there is a probability that the vehicle blocks a signal. Therefore, it is possible to consider a method of transferring a signal far away using multi-hop communication between vehicles. However, in multi-hop communication, a delay increases with the increase in the number of hops. This makes it difficult to transfer a signal within 3 ms. Therefore, a technique is needed to minimize the increase in the delay even if the number of hops increases.

Accordingly, a method of transmitting a relay signal for V2X communication capable of solving the above problem and necessity will be described hereinafter.

Figure 11:
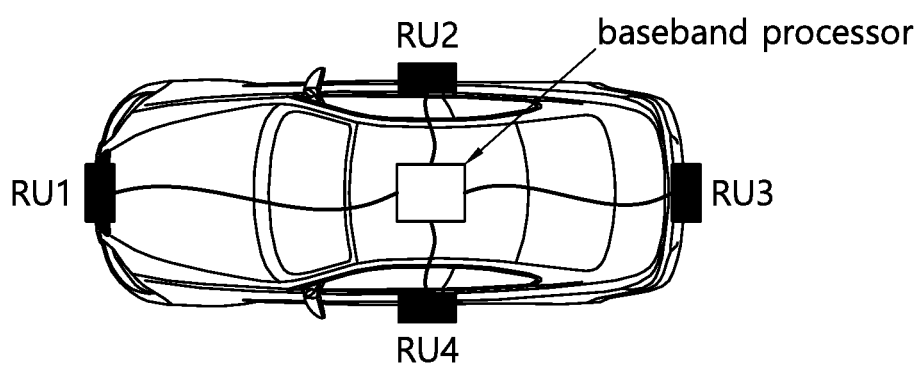
FIG. 11 shows an example of deploying a baseband processor and a radio unit (RU) in a vehicle which performs V2X communication.

FIG. 11 shows an example of deploying a baseband processor and an RU in a vehicle which performs V2X communication.

In the present specification, a radio unit (RU) may consist of one or multiple physical antennas, and one RU may have one or multiple antenna ports. The RU may simply have only a function of an RF module. When the RU simply has only the function of the RF module, the RU is the same as an antenna. In addition thereto, if the RU has only one antenna port, a single RU is the same as a single antenna port. The RU may include not only the function of the RF module but also the part or entirety of an L1 function or up to the part of an L2/L3 function.

In the present specification, the UE also includes a vehicle having a communication module installed therein, in addition to the existing mobile phone and smart phone. Referring to FIG. 11, the UE may have multiple RUs (RU 1, RU 2, RU 3, RU 4, . . . ). In addition, it can be seen that the multiple RUs are connected to a baseband processor.

In the present specification, a subframe is a time unit of a physical layer, and may be replaced with a time duration, a transmission time duration, a slot, a transmission unit (TU), or the like. In addition, a road side unit (RSU) described in the present specification may be a UE-type RSU or a BS-type RSU.

For example, when n vehicles constitute one platoon group, one communication group may be constituted by aggregating the n vehicles and an adjacent BS (herein, n is a natural number). For another example, all vehicles in a cell and a BS of the cell may constitute one communication group. In addition, one UE may belong to different communication groups at the same time.

Space division duplex communication described in the present specification implies not only communication in which an RU 1 and RU 2 of a UE 1 simultaneously transmit/receive signals but also communication in which the RU 2 can receive a signal while the RU 1 performs transmission or the RU 1 can receive a signal while the RU 2 transmits a signal. For this, the RU 1 and the RU 2 may be considered as a separate transmission and reception unit (TXRXU).

Although an entity for scheduling communication between UEs is described as a BS in the present specification, the BS may be replaced with an RSU or a UE-type RSU or a cluster head UE which is in charge of communication between the UEs.

A case where a UE is capable of configuring a beam group is assumed in the present specification. In the present specification, the beam group implies a unit by which the UE can independently perform transmission or reception. That is, a different beam group has a separate TXRXU. If self-interference between TXRXUs included in different beam groups is less than or equal to a specific value or can be decreased to be less than or equal to the specific value by using a self-interference canceller, the UE can transmit a signal in a beam group 2 while receiving a signal in a beam group 1. In addition, the beam group may be configured such that a Tx beam group and an Rx beam group are the same as or different from each other.

The beam group may correspond to the TXRXU in a one-to-one or one-to-many manner. That is, when the UE has N TXRXUs, the UE may construct N or less beam groups. In addition, the beam group may consist of one or more analog beams. For example, if the UE has N TXRXUs and analog beamforming is not applied to each TXRXU, the UE may have N beam groups and each beam group may consist of one beam. In this case, the beam group is the same as the TXRXU. For another example, if the UE has N TXRXUs and analog beamforming is applied to each TXRXU, the UE may have N beam groups and each beam group may consist of multiple beams.

Figure 12:
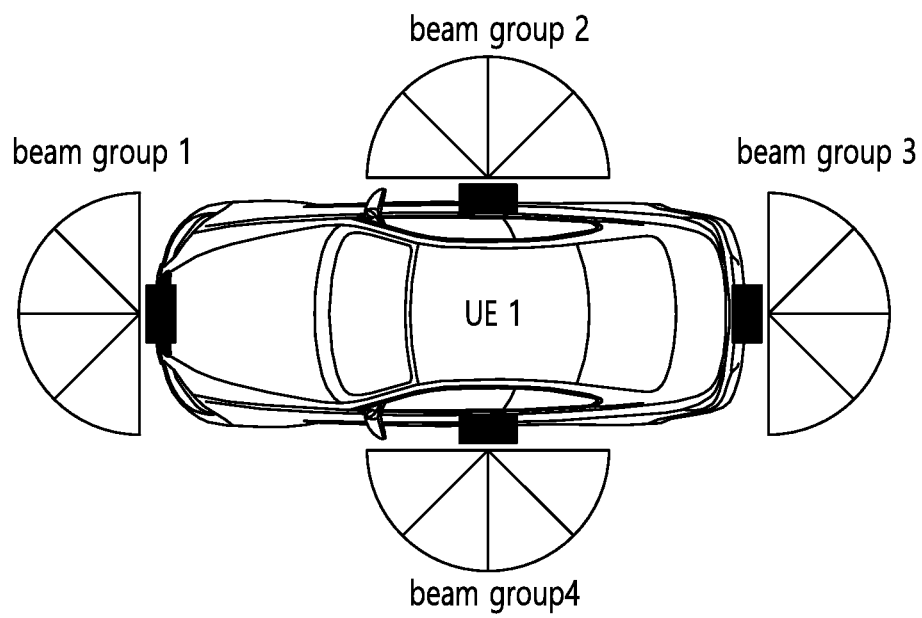
FIG. 12 shows an example of constituting a beam group for V2X communication.
Figure 12:
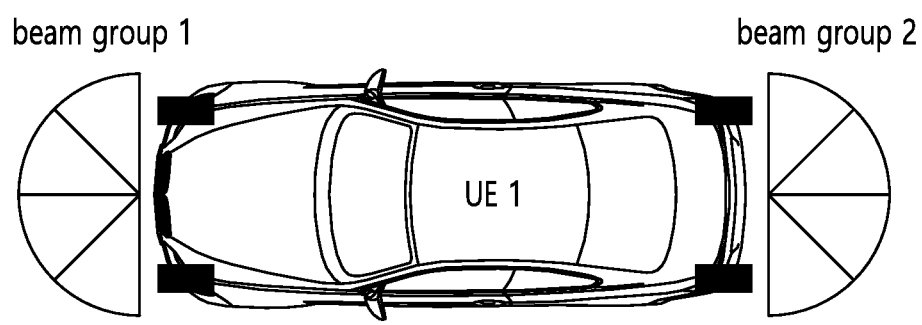
Figure 13:
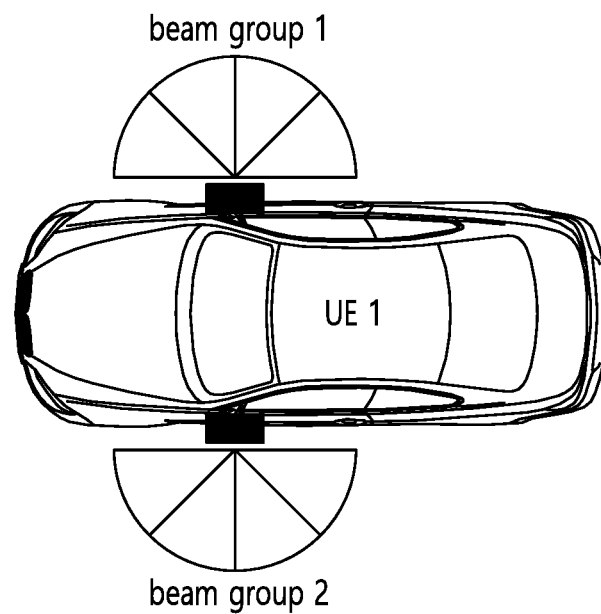
FIG. 13 shows another example of constituting a beam group for V2X communication.
Figure 13:
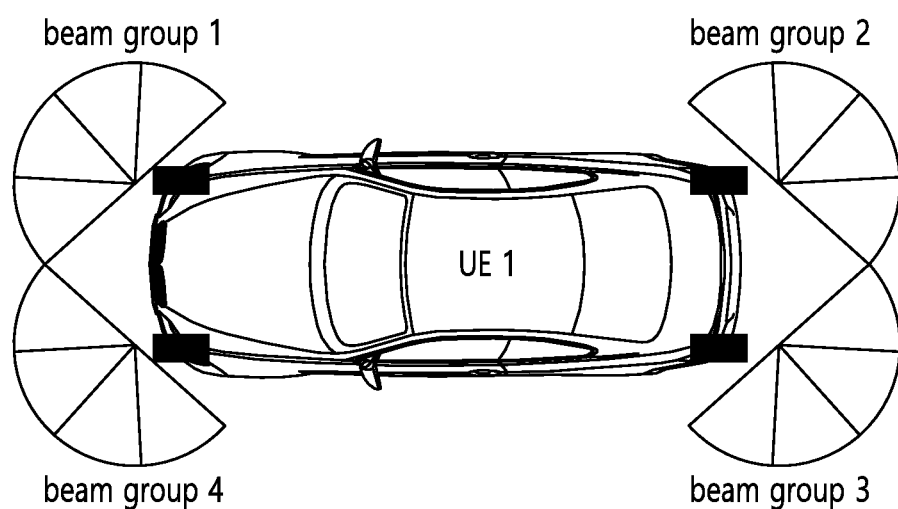

FIG. 12 and FIG. 13 are examples of constructing a beam group when each RU has a separate TXRXU. In FIG. 12 and FIG. 13, a fan-shaped portion indicates a single beam, and implies a case where one beam group consists of four beams.

FIG. 12 shows an example of constituting a beam group for V2X communication.

In an upper end of FIG. 12, a UE 1 has four beam groups, and four TXRXUs are located in front, rear, and both sides of a vehicle. In a lower end, the UE 1 has two beam groups, and four TXRXUs are located only in front and rear of the vehicle.

FIG. 13 shows another example of constituting a beam group for V2X communication.

In an upper end of FIG. 13, a UE 1 has two beam groups, and two TXRXUs are located only in both sides of a vehicle. In a lower end of FIG. 13, the UE 1 has four beam groups, and four TXRXUs are located at corner portions in front and rear of the vehicle.

In what follows, the present specification aims to propose an interference measurement procedure by which a terminal having a plurality of radio units (RUs) receives a signal from a specific RU while transmitting a signal through other RU; and signaling related to the procedure. In particular, the present specification takes into account a case where interference exists between RUs, and an analog interference canceller capable of removing the interference is included in the RU.

Figure 14:
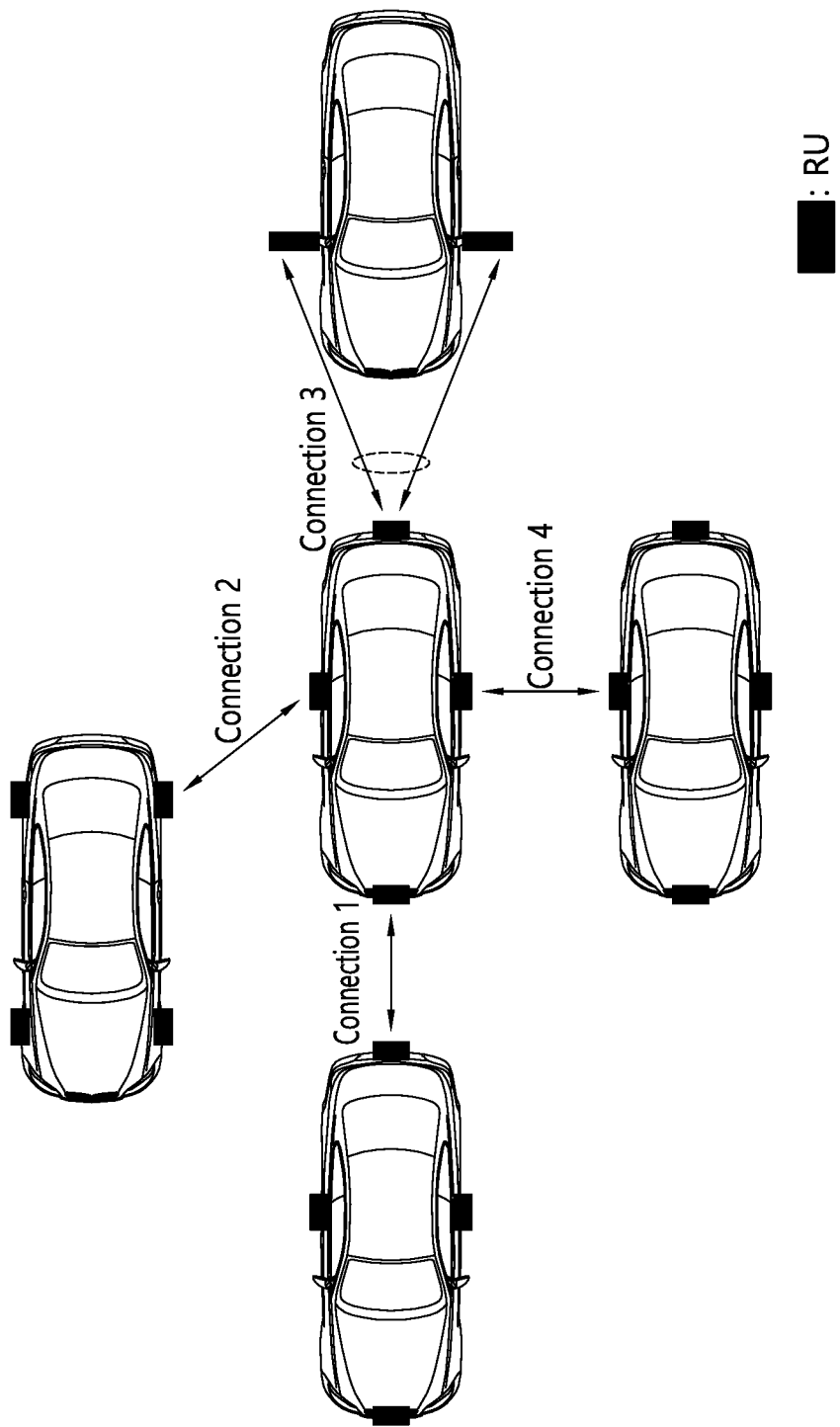
FIG. 14 illustrates one example where a plurality of communication connections are established among vehicles having a plurality of RUs.

FIG. 14 illustrates one example where a plurality of communication connections are established among vehicles having a plurality of RUs.

To provide services such as platooning, convoy, and cooperative maneuver assistance described above, a vehicle needs to establish a communication connection to other vehicles in its front, back, left and right sides as shown in FIG. 14. Therefore, a vehicle which has received the corresponding service forms a plurality of V2V links. Also, for a service such as platooning or convoy described in the scenario 3, it is important to achieve high reliability while satisfying a delay of about 3 ms.

The current LTE V2V communication has been developed to broadcast information of a vehicle in the surroundings thereof, and standardization of V2V connection establishment for unicast has not been carried out. Moreover, since it is important to transmit a signal in all directions for broadcasting, V2V communication technology has been developed under an assumption that a vehicle is equipped with a single RU having omni-antenna characteristics; however, it is expected that vehicles equipped with a plurality of RUs with directivity will be introduced in a near future. As shown in FIG. 14, if vehicle establishes a plurality of V2V communication connections, it is expected that a vehicle equipped with a plurality of RUs will have an advantage in terms of communication delay and capacity, technology development is needed, which enables a vehicle with a plurality of RUs to establish a plurality of communication connections. Besides, as shown in FIG. 14, if a vehicle equipped with a plurality of RUs performs an operation of transmitting a signal through a specific RU while receiving a signal from other specific RU, an advantage is obtained that signals may be transmitted within a shorter time period.

According to the present specification, an RU may be composed of one or more physical antennas, and one RU may have one or more antenna ports. An RU may provide only the function of a simple RF module or provide the whole or part of L1 function. Also, an RU may include part of L2/L3 function. If an RU has one antenna port and provides only the function of an RF module, a single RU is the same as a single antenna port. Therefore, an RU according to the present invention may be substituted by an antenna port group, antenna port, or antenna module.

In the present specification, a terminal includes a vehicle equipped with a communication model in addition to an existing mobile phone and smartphone, and the terminal may have a plurality of RUs. In the present specification, a subframe is a time unit of the physical layer and may also be called a time interval, transmission time interval, slot, or transmission unit (TU).

Space division duplex communication according to the present specification refers to such kind of communication by which not only RU1 and RU2 of a terminal may transmit and receive a signal simultaneously but also RU2 may receive a signal while RU1 transmits a signal or RU1 may receive a signal while RU2 transmit a signal. Also, a road side unit (RSU) in the present specification may be an RSU in the form of a terminal or an RSU in the form of a base station.

Space division duplex communication according to the present invention refers to such kind of communication by which not only RU1 and RU2 of a terminal may transmit and receive a signal simultaneously but also RU2 may receive a signal while RU1 transmits a signal or RU1 may receive a signal while RU2 transmit a signal. To this purpose, RU1 and RU2 may be regarded as a separate transmission and reception unit (TXRXU).

In the present description, it is assumed that one UE has a plurality of RUs and each RU has an analog interference cancellation function for cancelling interference of other RUs in the same UE. Interference information 1 and interference information 2 are interference information between different RUs belonging to the same UE, interference information 1 is residual interference after analog interference cancellation and interference information 2 is interference information before analog interference cancellation.

For example, a UE measures inter-RU interference to obtain interference information 1 and interference information 2. When UE1 has RU1 and RU2, if interference information 1 of RU2 which has been measured by RU1 of UE1 is less than threshold value 1, it is determined that transmission (space division duplex communication) of RU2 can be performed when RU1 receives signals. Further, RU1 does not periodically measure interference of RU2 if interference information 2 of RU2 which has been measured by RU1 of UE1 is less than threshold value 2, whereas RU1 periodically measures interference of RU2 while space division duplex communication is performed if interference information 2 is greater than the threshold value.

Since interference information 1 refers to the strength of inter-RI interference after analog interference cancellation is performed, space division duplex communication can be realized only when the value of interference information 1 can be removed through digital interference cancellation or processed as noise. The interference information 2 refers to the strength of interference before analog interference cancellation is performed and it is possible to determine whether inter-RU interference needs to be measured through this value. For example, when the size of interference information 2 is small and thus inter-RU interference can be processed as noise, it is not necessary to periodically perform inter-RU interference measurement. However, when the size of interference information 2 is large but the size of interference information 1 is small, it is important to accurately perform analog interference cancellation. To this end, it is important to perform periodic inter-RU interference measurement. Accordingly, in this case, periodic interference measurement is required to perform space division duplex communication.

FIG. 11 shows an example in which a vehicle has a plurality of RUs. Referring to FIG. 11, it is expected that the size of interference information 2 is small because interference between RU1 and RU3 and between RU2 and RU4 of the vehicle is insignificant. On the contrary, interference between RU1 and RU2, between RU1 and RU4, between RU3 and RU2 and between RU3 and RU4 may be significant and thus periodic inter-RU interference measurement may be required.

A UE generates interference information 1 and interference information 2 per RU pair.

It can be expected that interference of RU2 which affects RU1 is significant when interference of RUI which affects RU2 is significant due to channel reciprocity property. In addition, when RU1 has efficiently canceled interference of RU2 using analog interference cancellation to obtain interference information 1 having a small size, interference information 1 of RU2 can be expected to be low. Accordingly, it is possible to generate interference information 1 and interference information 2 per RU pair. When the present embodiment is used, interference information 1 and interference information 2 can be transmitted for a total of N(N−1)/2 RU pairs with respect to N RUs. If channel reciprocity property is not used, each RU needs to transmit interference information and thus a total of N(N−1) pieces of interference information 1 and interference information 2 need to be transmitted to an eNB.

To perform actual analog interference cancellation, accurate inter-RU channel estimation is required and thus channel estimation for analog interference cancellation may need to be performed for each RU. However, determination of whether space division duplex communication can be performed and determination of periodic inter-RU interference measurement are less affected by a small scaling parameter of a channel, and thus the interference information can be generated per RU pair.

RU1 measures interference of RU2 and RU2 measures interference of RU1 such that a UE measures generates interference information 1 and 2 of the RU pair. Then, interference information 1 and 2 of the RU pair is generated using (1) the average of interference information measured by RU1 and interference information measured by RU2 or (2) a maximum value of interference information 1 and 2.

The aforementioned technique is advantageous when correct information of an RU pair is generated and it is determined that space division duplex communication cannot be performed or when interference measurement is prevented from being not performed although periodic interference measurement is required.

For example, a UE generates interference information 1 and 2 of an RU pair by measuring interference of only one of two RUs of the RU pair.

The aforementioned embodiment has the advantage of allocating only N−1 resources for interference measurement when a UE has N RUs. For example, when the UE has two RUs, only RU1 transmits a training sequence for interference measurement. When the UE has three RUs, RU2 and RU3 can receive a training sequence transmitted from RU1 and RU3 can receive a training sequence transmitted from RU2 to generate interference information 1 and 2. That is, the aforementioned embodiment can be used to reduce resources for interference measurement when a UE has a small number of RUs.

As another example, when a UE has N RUs, interference information 1 and 2 is generated using only one RU of an RU pair with respect to N RU pairs and interference information 1 and 2 is generated using both RUs of an RU pair with respect to the remaining RU pairs.

When a UE has three RUs, RU2 and RU3 can receive a training sequence transmitted from RU1 and RU1 and RU3 can receive a training sequence transmitted from RU2 to generate interference information 1 and 2. A pair of RU1 and RU2 generates interference information 1 and 2 using both RU1 and RU2 and a pair of RU1 and RU3 generates interference information 1 and 2 using only one RU of the RU pair. Since RU3 does not transmit a training sequence, an RU pair including RU3 needs to generate interference information 1 and 2 using only one RU of the RU pair.

As another example, a UE transmits measured interference information 1 and 2 to an eNB. The eNB determines whether space division duplex communication between RUs can be performed and the necessity of periodic inter-RU interference measurement on the basis of the interference information 1 and 2 received from the UE. When the UE requests additional communication connection later, the eNB determines whether space division duplex communication can be performed and the necessity of periodic inter-RU interference measurement using the additional communication connection.

The eNB has threshold value 1 and threshold value 2 and determines whether space division duplex communication can be performed and whether periodic inter-RU interference measurement is required on the basis of interference information 1 and 2 transmitted from the UE. Thereafter, the eNB schedules the UE using the determination results. To this end, the UE needs to transmit interference information 1 and 2 to the eNB.

Figure 15:
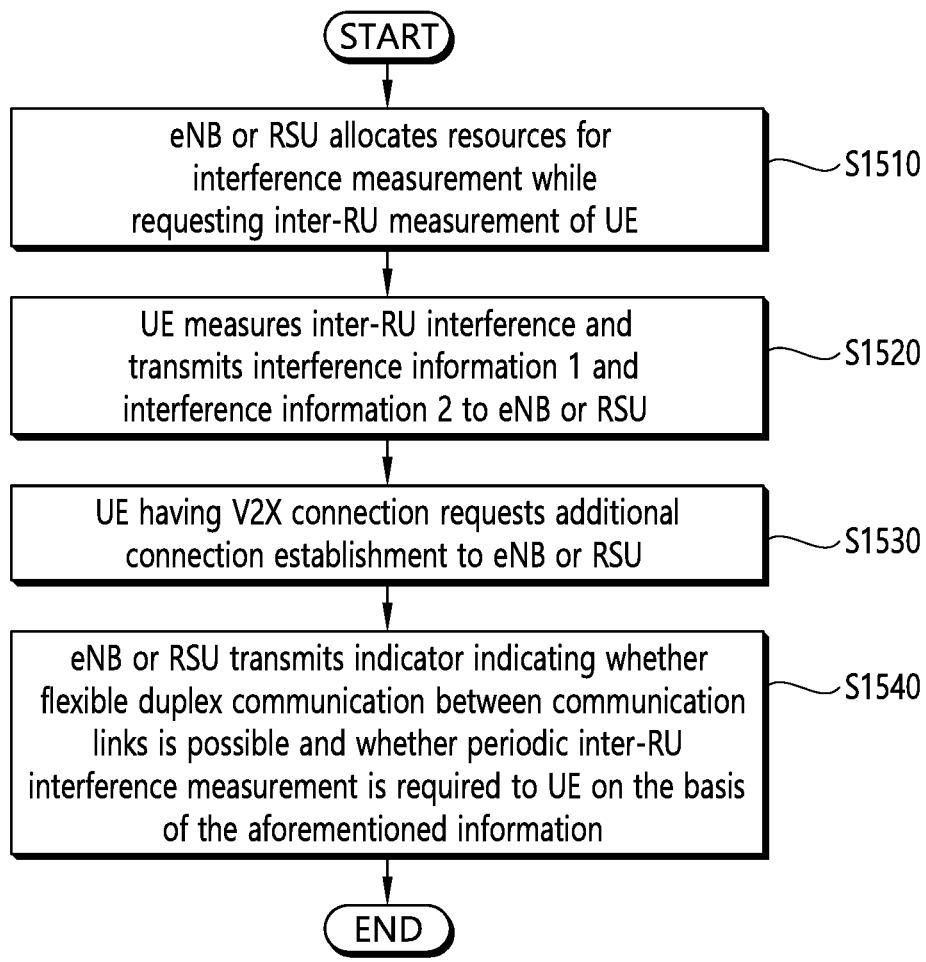
FIG. 15 is a flowchart showing a procedure of measuring inter-RU interference when an eNB or an RSU requests inter-RU interference measurement according to an embodiment of the present description.
Figure 16:
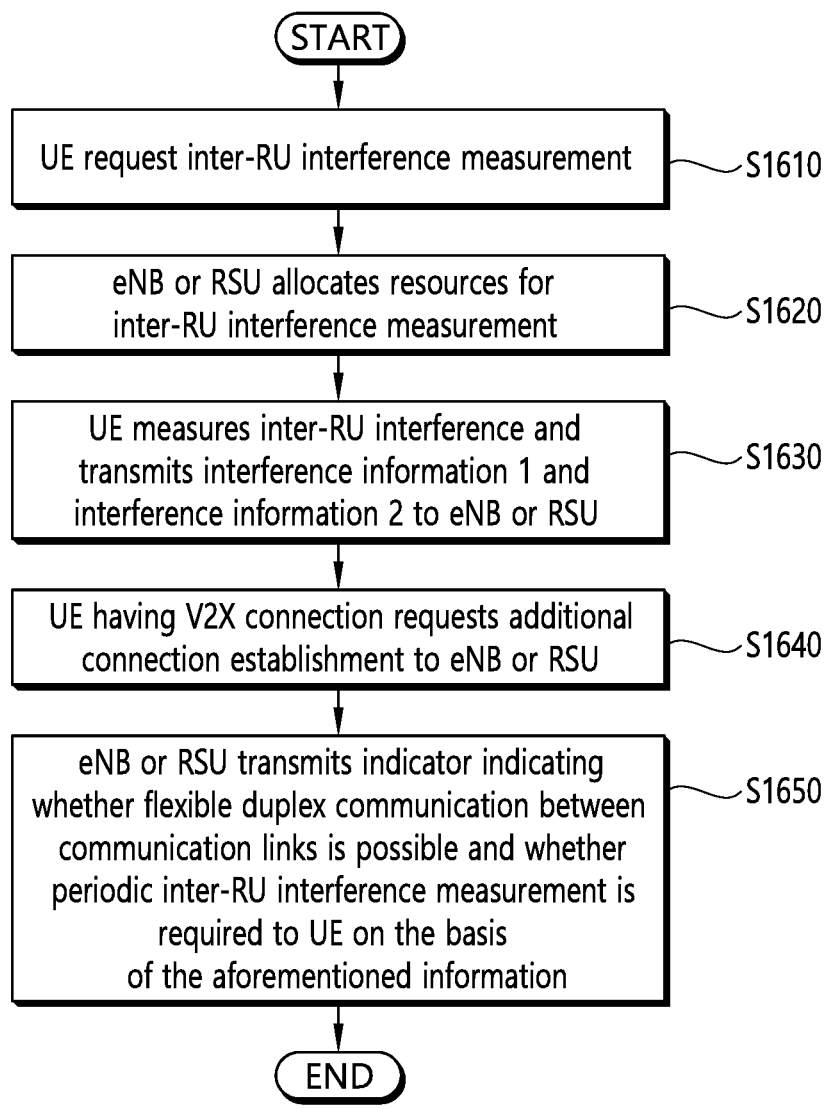
FIG. 16 is a flowchart showing a procedure of measuring inter-RU interference when a UE requests inter-RU interference measurement according to an embodiment of the present description.

Measurement of inter-RU interference by a UE may be started (1) at the request of an eNB or an RSU (which is illustrated in FIG. 15) or (2) at the request of the UE (which is illustrated in FIG. 16).

Methods of transmitting interference information 1 and 2 by a UE are as follows. (1) A UE having N RUs transmits interference information 1 and 2 for each of N(N−1)/2 RU pairs to an eNB or (2) each RU transmits N(N−1) pieces of interference information 1 and 2 measured thereby to the eNB.

When new communication connection is established, the UE transmits index information about radio unit (RU) candidates that can be used for the connection to the eNB. The eNB compares interference information 1 with threshold value 1 to determine whether space division duplex communication is performed. If reference interference information 1 is less than threshold value 1 but interference information 2 is greater than threshold value 2, the eNB causes the UE to measure interference between RUs used for V2X connection and then activates space division duplex communication. Further, the eNB causes the UE to periodically measure inter-RU interference after activation of space division duplex communication.

FIG. 15 is a flowchart showing a procedure of measuring inter-RU interference when an eNB or an RSU requests inter-RU interference measurement according to an embodiment of the present description.

In step S1510, the eNB or RSU allocates resources for interference measurement to a UE while requesting inter-RU interference measurement.

In step S1520, the UE measures inter-RU interference and transmits interference information 1 and interference information 2 to the eNB or RSU.

In step S1530, the UE having V2X connection sends a request for additional connection establishment to the eNB or RSU.

In step S1540, the eNB or RSU transmits an indicator indicating whether flexible duplex communication between communication links can be performed and whether periodic inter-RU interference measurement is required to the UE on the basis of interference information 1 and 2.

FIG. 16 is a flowchart showing a procedure of measuring inter-RU interference when a UE requests inter-RU interference measurement according to an embodiment of the present description.

In step S1610, the UE sends a request for inter-RU interference measurement to an eNB.

In step S1620, the eNB or an RSU allocates resources for inter-RU interference measurement.

In step S1630, the UE measures inter-RU interference and transmits interference information 1 and interference information 2 to the eNB or RSU.

In step S1640, the UE having V2X connection sends a request for additional connection establishment to the eNB or RSU.

In step S1650, the eNB or RSU transmits an indicator indicating whether flexible duplex communication between communication links can be performed and whether periodic inter-RU interference measurement is required to the UE on the basis of interference information 1 and 2.

As another example, the eNB or RSU transmits threshold values 1 and 2 that are threshold values of interference information 1 and 2 to the UE. The UE compares received threshold value 1 with interference information 1 to determine whether flexible transmission can be performed and compares threshold value 2 with interference information 2 to determine the necessity of periodic inter-RU interference measurement for space division duplex communication.

The aforementioned embodiment has the advantage of reducing the quantity of information transmitted from a UE to an eNB compared to the embodiment in which interference information is directly transmitted. For example, a case in which a UE having N RUs transmits information about N(N−1)/2 RU pairs is assumed. If p bits are necessary for each piece of interference information when the UE directly signals interference information 1 and 2 to an eNB, a total of N(N−1)p bits are required. However, when the UE signals only whether interference information 1 and interference information 2 exceed the threshold values, only 1-bit information is necessary for each RU pair and thus information delivery can be performed using only N(N−1) bits.

In addition, when the aforementioned embodiment is used, since the UE can determine whether space division duplex communication can be performed, space division duplex communication can be applied even when the UE is out of a cell coverage.

The eNB or RSU can transmit threshold values to the UE through the following two methods. (1) Interference information 1 and interference information 2 are broadcast as system information in a cell or (2) the eNB or RSU transmits interference information 1 and interference information 2 through an RRC message or an L1/L2/L3 message as information corresponding to only an arbitrary UE.

Figure 17:
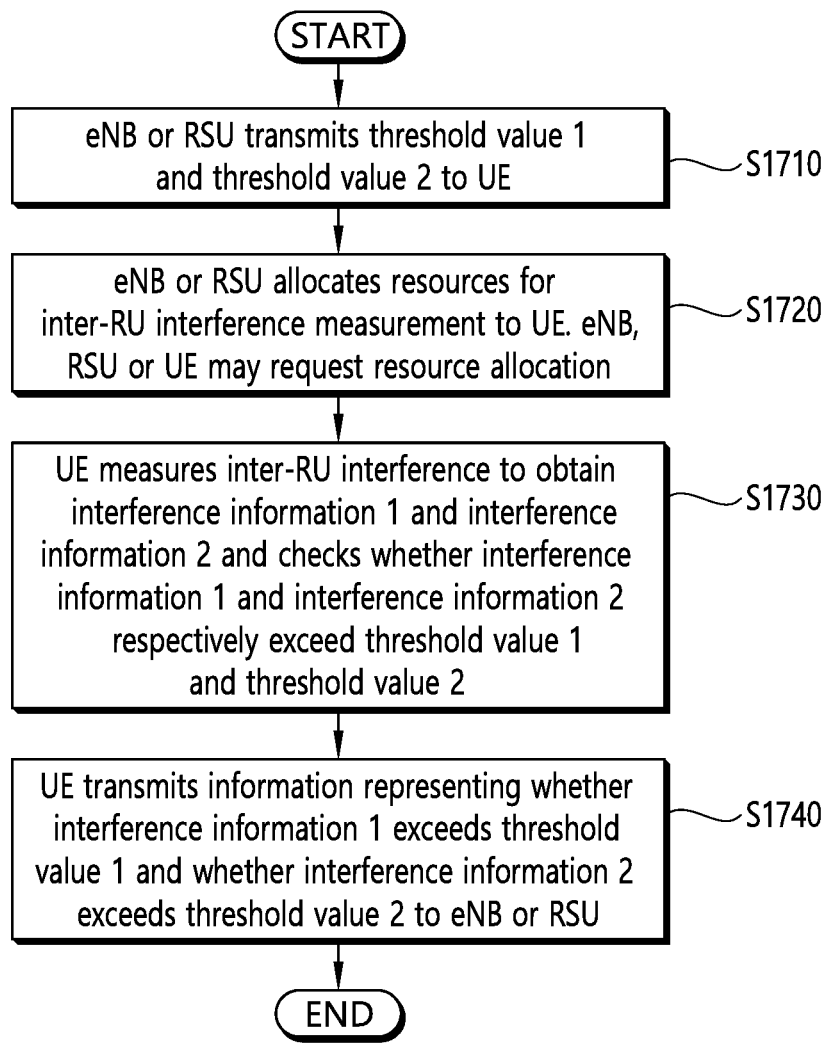
FIG. 17 is a flowchart showing a procedure of transmitting quantized interference information 1 and 2 by a UE according to an embodiment of the present description.

In addition, the UE transmits information representing whether interference information 1 exceeds threshold value 1 and whether interference information 2 exceeds threshold value 2 to the eNB. The eNB detects whether space division duplex communication operation of the UE can be performed and the necessity of periodic inter-RU interference measurement on the basis of the information. FIG. 17 is a flowchart showing an operation of a UE to transmit only information representing whether interference information 1 exceeds threshold value 1 and whether interference information 2 exceeds threshold value 2 to an eNB.

FIG. 17 is a flowchart showing a procedure of transmitting quantized interference information 1 and 2 by a UE according to an embodiment of the present description.

In step S1710, an eNB or an RSU transmits threshold values 1 and 2 to the UE.

In step S1720, the eNB or RSU allocates resources for inter-RU interference measurement. The eNB, the RSU or UE may request resource allocation.

In step S1730, the UE measures inter-RU interference to obtain interference information 1 and interference information 2 and determines whether interference information 1 and interference information 2 respectively exceeds threshold values 1 and 2.

In step S1740, the UE transmits information representing whether interference information 1 exceeds threshold value 1 and whether interference information 2 exceeds threshold value 2 to the eNB or RSU.

As another example, threshold values 1 and 2 that are threshold values of interference information 1 and 2 may be input in advance as system information. A UE compares interference information 1 with received threshold value 1 to determine whether flexible transmission can be performed and compares interference information 2 with threshold value 2 to determine the necessity of periodic inter-RU interference measurement for space division duplex communication.

Hereinafter, an object of the present description is to propose a method for determining whether to perform space division communication by a UE. In addition, an object of the present description is to propose a method for determining transmission antennas and reception antennas to be used when space division communication is performed.

Distributed antennas are expected to be applied to vehicles in the future. Interference between antennas may be very small in vehicles to which distributed antennas are applied due to the self-shadowing property. Accordingly, it is possible to apply full duplex radio (FDR) operation using the property. That is, an operation of receiving signals through some antennas of a vehicle and transmitting signals through some antennas can be performed.

Figure 18:
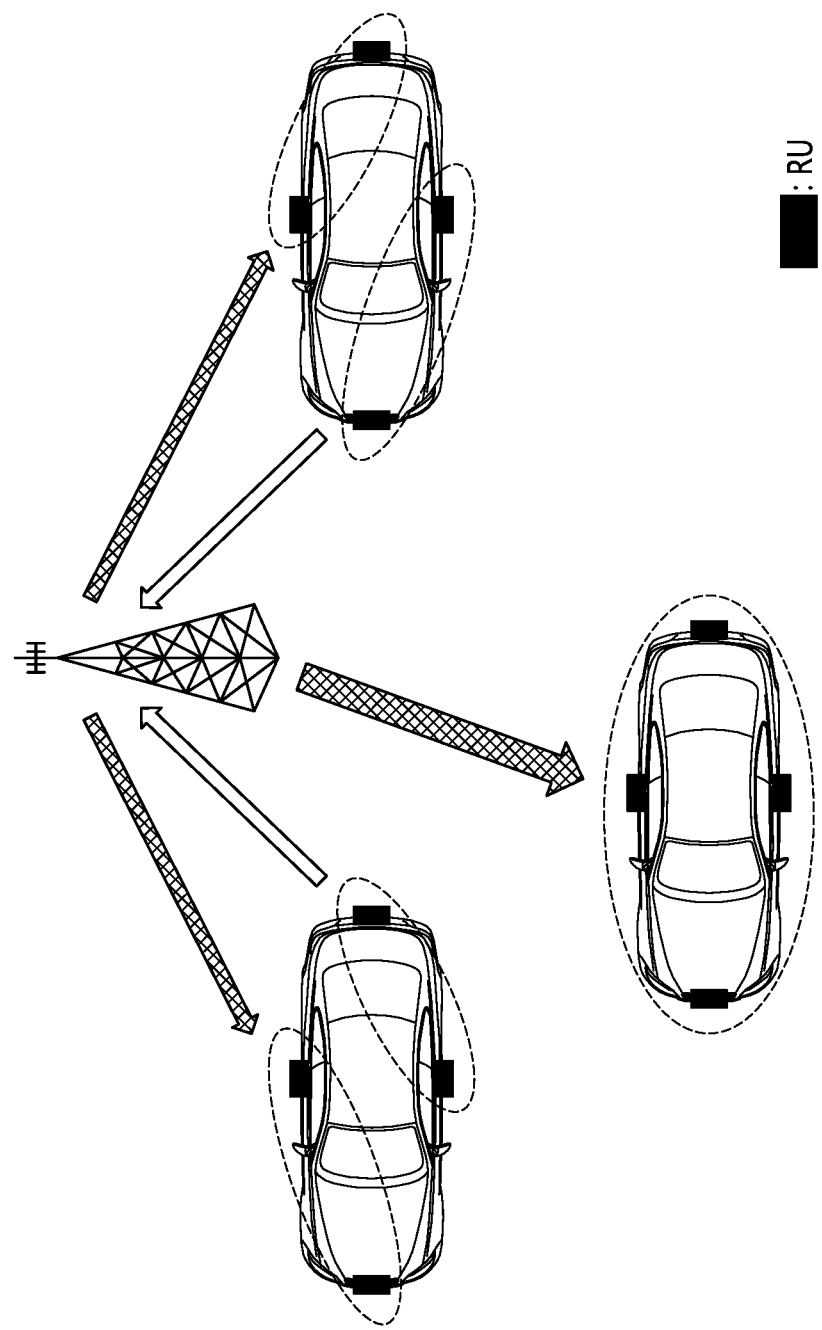
FIG. 18 shows an example of selecting a transmission RU and a reception RU when SDD is applied in communication between an eNB and a UE.
Figure 19:
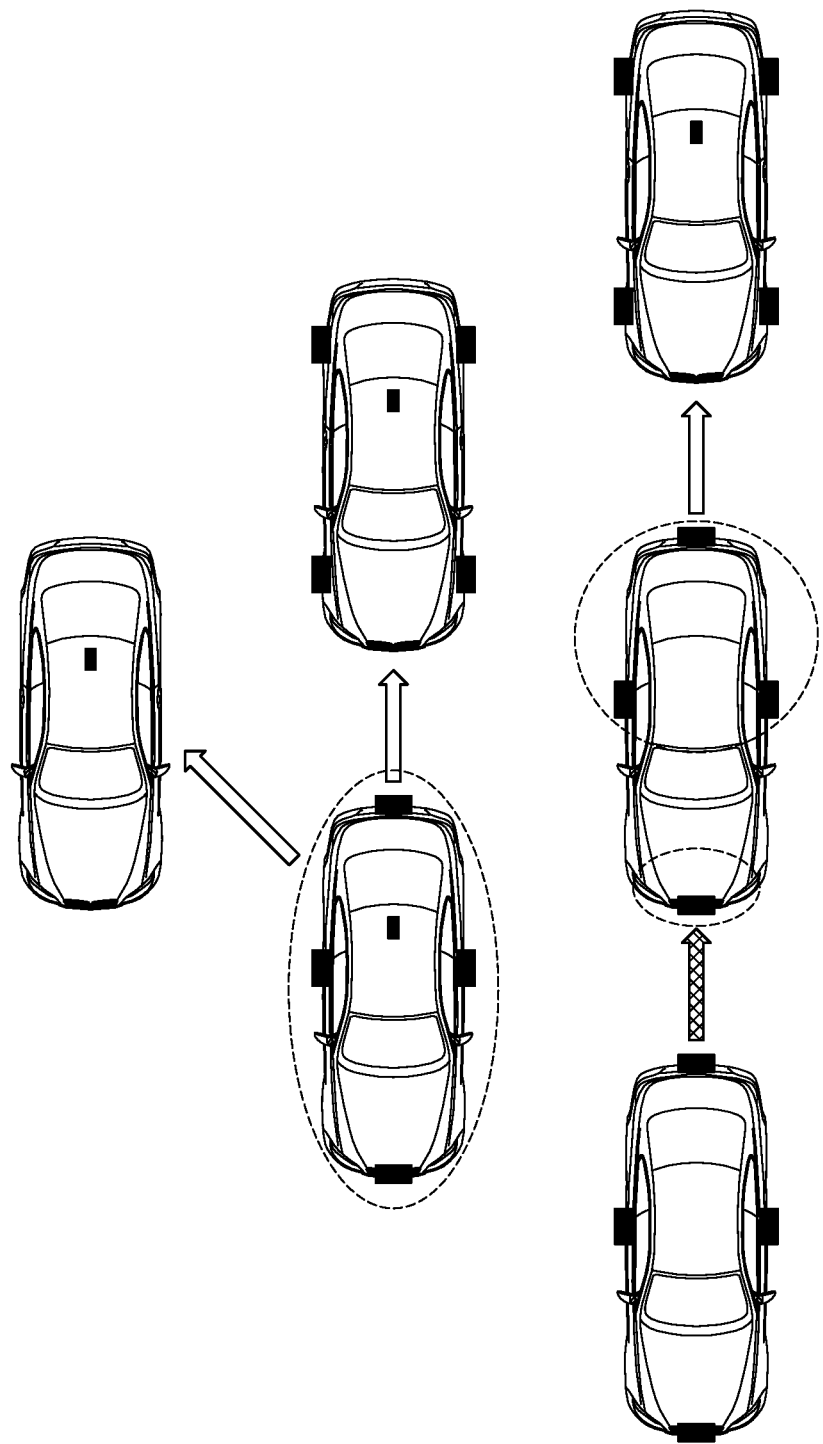
FIG. 19 shows an example of selecting a transmission RU and a reception RU when SDD is applied in communication between UEs.

FIG. 18 shows an example of selecting a transmission RU and a reception RU when SDD is applied in communication between an eNB and a UE. FIG. 19 shows an example of selecting a transmission RU and a reception RU when SDD is applied in communication between UEs.

An antenna group performing FDR in distributed antennas may be changed according to relative positions of a transmitter and a receiver. For example, when an eNB supporting FDR performs communication with a vehicle as shown in FIG. 18, a transmission antenna and a reception antenna can be distinguished from each other according to relative locations of the eNB and the vehicle as follows.

FIG. 19 shows an example in which a transmission antenna and a reception antenna are changed according to situation when space division communication is applied in communication between UEs. It can be ascertained from the embodiments of FIGS. 18 and 19 that it is necessary to determine whether FDR using space division is applied according to channel characteristics between devices performing communication and transmission antennas and reception antennas when FDR using space division is applied. The present description proposes a periodic signal transmission method for determining, by a UE, a transmission mode, a transmission antenna and a reception antenna to be used in the communication.

As mentioned above, to select a half duplex radio (HDR) mode and a full duplex radio (FDR) mode, a UE needs to perform periodic channel measurement. Here, channel measurement includes not only channel measurement between an eNB and the UE and self-interference measurement between antennas in the UE. In order for the UE to select a transmission antenna when the FDR mode is applied, self-interference needs to be accurately measured. Accordingly, it is desirable to perform direct measurement rather than estimating self-interference using channel reciprocity. That is, it is desirable to separately measure self-interference when antenna 1 transmits a signal and antenna 2 receives a signal and self-interference when antenna 2 transmits a signal and antenna 1 receives a signal.

In the present description, an eNB supporting FDR is assumed. In general, eNBs are located at high places and thus there are few factors that vary self-interference between eNB antennas. For example, a moving object is located around antennas to reflect self-interference and thus the strength of self-interference may change. However, moving objects are rarely present near an eNB. Further, an eNB easily physically isolates a transmission antenna from a reception antenna. Accordingly, a case in which self-interference between eNBs need not be periodically measured or is measured in a long period is assumed in the present description.

For example, a UE transmits a reference signal (RS) for self-interference measurement through some RUs and simultaneously receives an eNB RS and an RS for self-interference measurement through some RUs. For example, when an eNB transmits a channel state information RS (CSI-RS), some RUs of the UE also transmit a CSI-RS. Here, the CSI-RS transmitted by the eNB and the CSI-RS transmitted by the UE use resources orthogonal to each other. As another example, when the eNB transmits the CSI-RS, some RUs of the UE transmits an SRS in the same OFDM symbols. Here, the CSI-RS transmitted by the eNB and the SRS transmitted by the UE use resources orthogonal to each other.

A self-interference channel can be estimated by receiving, by an RU of a UE, a signal transmitted from another RU of the UE on uplink. However, since there is a case in which an RU to which UE SDD intends to be applied does not transmit signals on uplink, an eNB needs to instruct the UE to transmit a reference signal for self-interference measurement. Since the eNB may request reference signal transmission from the UE through an SRS, self-interference can be measured using the SRS. However, when the UE intends to perform both DL channel estimation and self-interference channel estimation, the UE receives a CSI-RS in a DL subframe and transmits an SRS in a UL subframe. Accordingly, a long time is required for the UE to perform DL and UL channel estimation. The present description proposes an operation in which a UE transmits a CSI-RS such that the UE can measure self-interference while receiving a CSI-RS transmitted from an eNB as an embodiment. Alternatively, this may be represented as a design in which the UE transmits an SRS when the eNB transmits the CSI-RS, and the SRS is orthogonal to the CSI-RS.

Here, a channel estimation step may include a step in which the UE measures a channel of the eNB (for example, using a CSI-RS), a step in which RU1 of the UE transmits a signal and RU2 receives a signal (for example, using an SRS) and a step in which RU2 of the UE transmits a signal and RU1 receives a signal (for example, using an SRS), in general. If a difference between self-interference and the strength of a signal transmitted from the eNB is about 70 to 80 dB, it is desirable to apply the aforementioned technique. However, when antennas are distributed and self-interference between RUs is reduced due to the self-shadowing property of a vehicle, a difference between self-interference and a signal transmitted from the eNB is reduced. Accordingly, it is possible to simultaneously measure self-interference between RUs and the signal transmitted from the eNB. For example, a repeater having a size of 400*650*320 mm can operate according to minimum 20 dB self-interference cancellation. Since a distance between antennas further increases in the vehicle, it can be expected that less self-interference is present.

Figure 20:
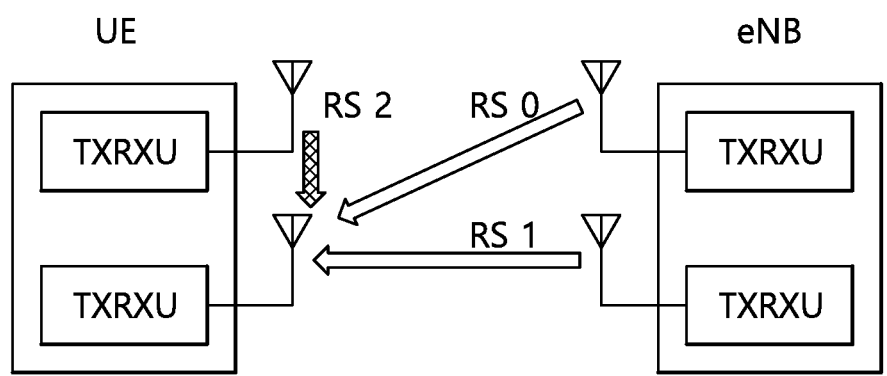
FIG. 20 shows an example of transmitting a self-interference measurement RS and receiving an RS transmitted from an eNB when a UE and the eNB have two RUs.
Figure 20:
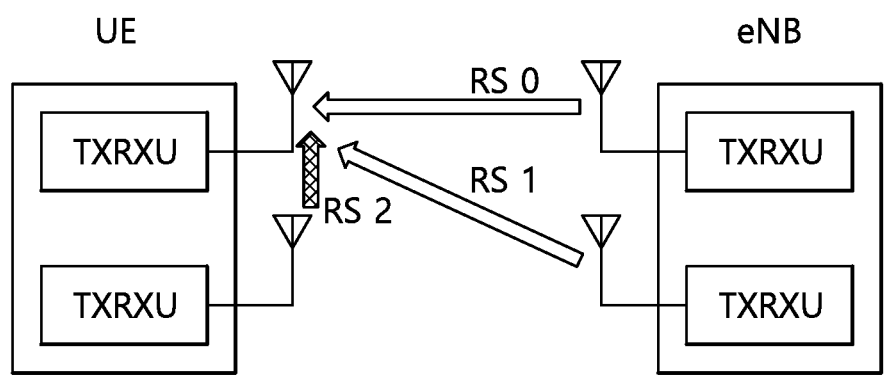
Figure 21:
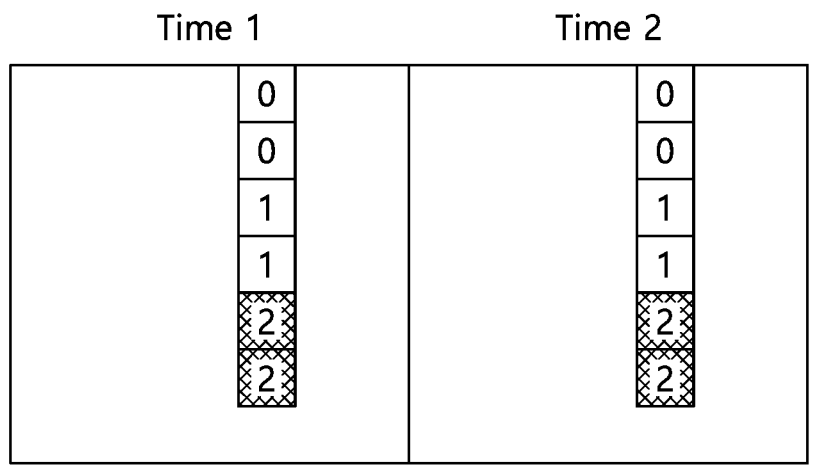
FIG. 21 shows an example of a method of transmitting a reference signal according to an embodiment of the present description.
Figure 22:
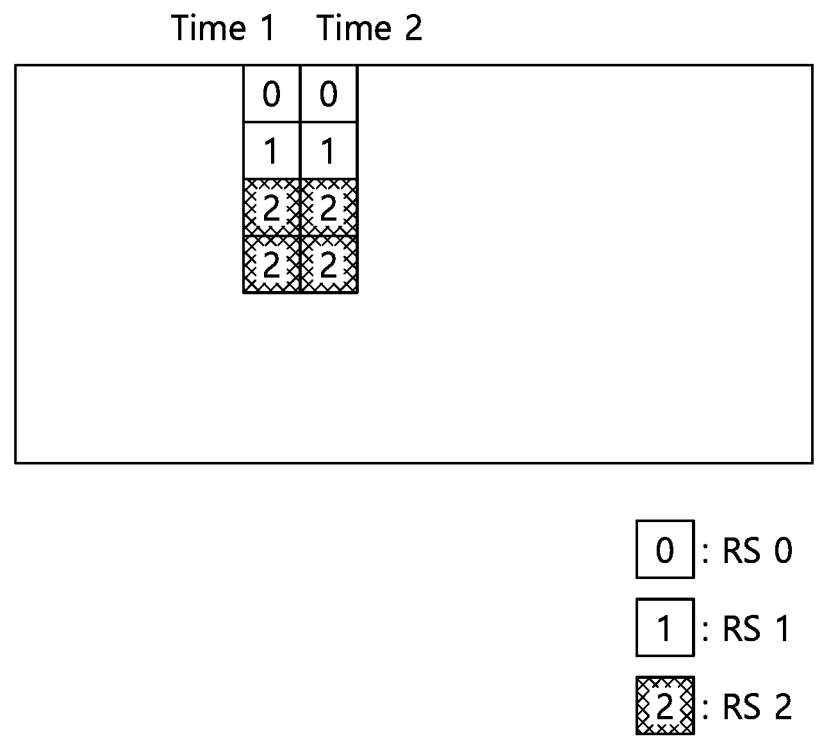

FIGS. 20 to 22 are diagrams showing cases to which the above-described embodiment is applied.

FIG. 20 shows an example of transmitting an RS for self-interference measurement and receiving an RS transmitted from an eNB when a UE and an eNB have two RUs.

FIG. 20 assumes a case in which the UE has two RUs and the eNB has two RUs. It is necessary for the UE to distinguish a signal received from the eNB from a self-interference signal by allocating resources orthogonal to each other to reference signals RS0 and RS1 of RUs transmitted from the eNB and a reference signal RS2 of an RU transmitted from the UE.

FIGS. 21 and 22 are diagrams showing points in time at which an operation of Time 1 and an operation of Time 2 are performed in the aforementioned embodiment.

FIG. 21 shows an example of a reference signal transmission method according to an embodiment of the present description. FIG. 22 shows another example of the reference signal transmission method according to an embodiment of the present description.

FIG. 21 shows an embodiment when Time 1 and Time 2 are performed having an interval of several OFDM symbols therebetween and FIG. 22 shows a case in which Time 1 and Time 2 are consecutively arranged. The case of FIG. 21 has the advantage of accurate channel estimation over the case of FIG. 22. On the other hand, the case of FIG. 22 has the advantage of reducing the amount of resources allocated to RS0 and RS1 according to consecutive arrangement of RS0 and RS1 (the amount of resources allocated to RS0 and RS1 is reduced). However, in the case of FIG. 22, the RU of the UE needs to be able to perform Tx/Rx switching within a CP length.

When the above-described technique is applied, the following advantages are obtained. First, channel estimation including self-interference can be completed through two transmissions. In addition, the number of reception antennas is reduced when a UE transmits an RS for self-interference measurement, and thus a gain is reduced when a signal is received. Accordingly, it is desirable to allocate a large number of RSs to resources through which the UE transmits the RS for self-interference measurement and to transmit data through other resources. For example, when the RS for self-interference measurement is transmitted in the embodiment of FIG. 20, an antenna gain of a receiver is reduced by 3 dB (because one antenna is used to transmit the RS for self-interference measurement). Accordingly, it is desirable to transmit a large number of RSs in corresponding resources.

eNB signaling for causing a UE to perform the operation of the aforementioned embodiment includes the following information.

The number N (n=1, 2, mmm, N) of repeated transmissions of an RS of an eNB or an RS transmission period of the eNB Transmission RU information of a UE in n-th transmission and RS information allocated to each transmission RU RU information (for example, an RU index, a reception beam index or an antenna index) of a UE which will receive an eNB RS in n-th transmission Further, the eNB signaling may include indication information indicating that transmission to a specific RU will not be performed in n-th transmission. For example, the indication information may be represented as a transmission beam index, an RU index, an antenna port or an antenna index. Here, the UE can arbitrarily determine whether to perform self-interference measurement in the RU for which transmission is prohibited.

Although the UE which has received RU information of a UE that will receive an eNB RS in the n-th transmission among the aforementioned information need not measure self-interference in all RUs indicated by the eNB, the UE needs to update channel information for an RU indicated by the eNB when updating channel information to the eNB. For example, the eNB may request the UE to cause RU2 and RU3 to measure a signal transmitted by RU1 and update self-interference information. Here, when the UE is using RU3 for other purposes, the UE may measure interference of RU1 only through RU2 and may not measure interference through RU3. Thereafter, when the UE updates channel information to the eNB, the UE sets a self-interference strength of RU3 to a largest value and transmits the same to the eNB. Upon reception of the self-interference strength, the eNB can be aware that RU1 and RU3 cannot operate in an FDR form.

The UE changes transmission power $S_{power}$ of an RS for self-interference measurement using long-term channel information of inter-RU interference and long-term channel information of a downlink signal.

In distributed antennas, the strength of inter-RU interference is further reduced than in conventional FDR. However, the strength of a self-interference signal may still be greater than the strength of a downlink signal. In this case, the strength of the self-interference signal may be out of an automatic gain control (AGC) range of a receiver which has been set to downlink reception. To prevent this, it is necessary to adjust transmission power of a self-interference signal to the strength of a downlink average reception signal. For example, it is possible to adjust transmission power in proportion to a value obtained by dividing the average strength of downlink signals by the average strength of self-interference signals. If the average strength of self-interference signals is $SNR_{self\_interf}$ and the average strength of downlink signals is $SNR_{BS}$, $S_{power}=SNR_{BS}/SNR_{self\_interf}*Power$. Here, it is assumed that the average SNR value is acquired in the measurement step or known in advance.

Hereinafter, a signal transmitted from a UE to an eNB in order to reduce the number of pairs of transmission RUs and reception RUs which perform self-interference measurement when the aforementioned embodiment is used will be described.

For example, a UE transmits, to an eNB, information on a group of RUs which simultaneously transmit RSs for self-interference measurement and interference strength information in the RU group. Here, the interference strength information in the RU group may be designed to be transmitted only when the corresponding value is equal to or less than a threshold value.

In order for a UE having a large number of RUs to measure self-interference among all RUs, a large amount of resources is required. Accordingly, it is necessary to reduce the number of candidate groups by designating transmission and reception RU pairs (Tx-Rx pairs) which periodically measure self-interference in advance. Further, this problem is aggravated if beam scanning is applied in each RU.

The necessity of periodic self-interference measurement can be determined through inter-RU long-term self-interference information. However, it is difficult to include the strength of long-term self-interference of a Tx-Rx RU pair in a modem in advance. This is because a main factor which determines the strength of inter-RU long-term self-interference is the self-shadowing property according to antenna arrangement of a terminal and the form of the terminal and thus it is difficult to aware of the strength of long-term self-interference in a modem manufacturing step when a vehicle manufacture differs from a modem manufacturer. Accordingly, the UE needs to generate long-term self-interference information in advance through self-interference measurement.

Figure 23:
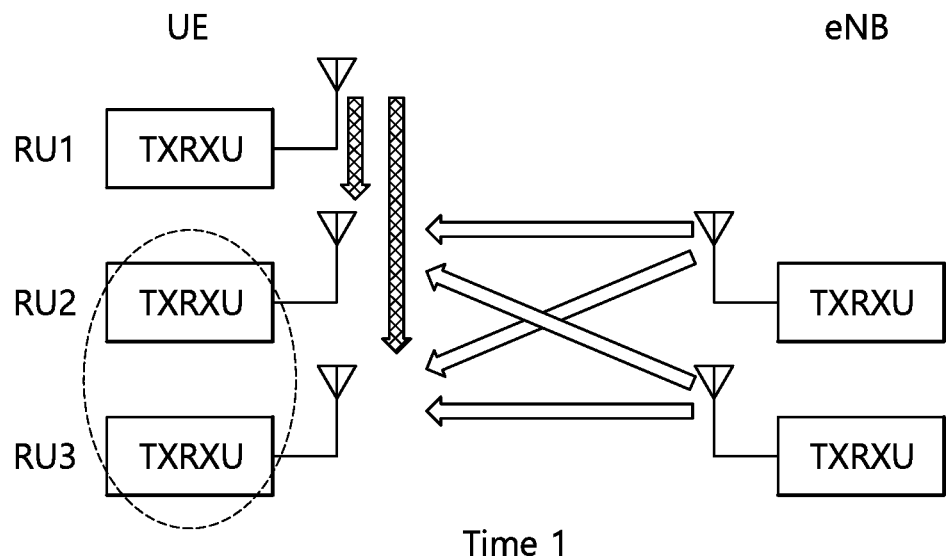
FIG. 23 shows an example of transmitting a self-interference measurement RS and receiving an RS transmitted from an eNB on the basis of Table 1.
Figure 23:
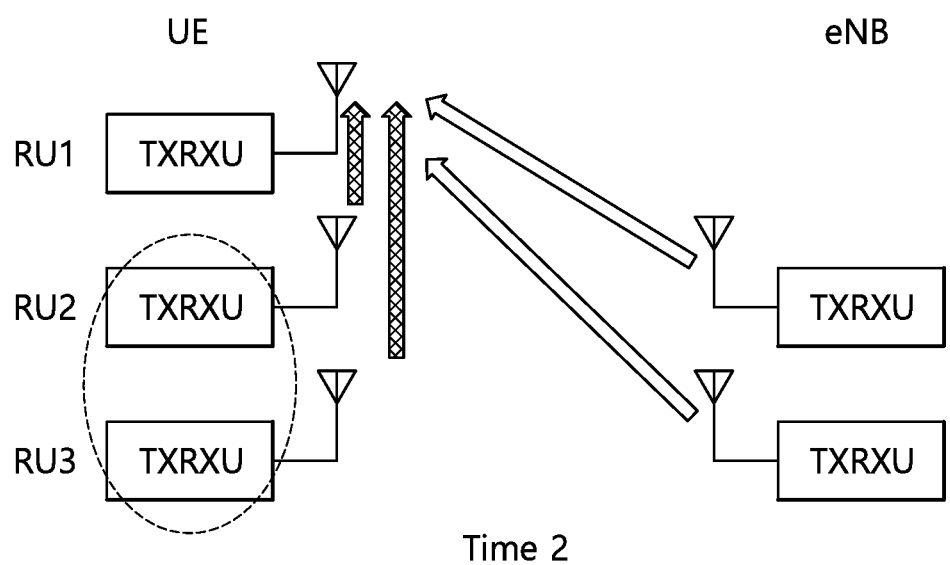

An embodiment when the above-described technique is applied to signaling transmitted from a UE to an eNB is shown in Table 1 and FIG. 23. The UE delivers information in the form of a look-up table such as Table 1 to the eNB.

TABLE 1

Self-interference measurement RS transmission RU group information

| Index | RU group |
|---|---|
| 0 | RU1 |
| 1 | RU2, RU3 |

Long-term self-interference information in RU pair that does not require instantaneous self-interference measurement

| Intf level | RU pair |
|---|---|
| X | RU2, RU3 |

FIG. 23 shows an example of transmitting an RS for self-interference measurement and receiving an RS transmitted from an eNB on the basis of Table 1.

In Table 1, RU2 and RU3 are an RU group (Index 1) which simultaneously transmits RSs for self-interference measurement. Here, when inter-RU long-term self-interference in the RU group is equal to or less than a threshold value, the UE transmits the strength of long-term self-interference of the RU pair to the eNB. To this end, the eNB can transmit the threshold value to the UE in advance as cell-common or UE-specific information. If long-term self-interference of the RU pair in the RU group is equal to or greater than the threshold value, the UE does not transmit the corresponding information. In this case, the eNB considers that FDR operation cannot be performed in an RU pair in an RU group from which information is not transmitted. Further, when the eNB has received long-term self-interference information about the RU pair, the eNB uses the corresponding interference value to determine a modulation scheme, a channel code rate and resource allocation (e.g., an MCS level, a TB size and the number of RBs) during transmission when operating in the form of FDR later.

That is, referring to FIG. 23 and Table 1, the UE transmits, to the eNB, information about an RU group (Index 1) which simultaneously receives RSs for self-interference measurement and long-term interference information (interference level X) between RUs (RU2 and RU3) in the RU group (Index 1) at Time 1. The eNB determines that FDR operation can be performed using RU2 and RU3 because the long-term self-interference information has been received with respect to the RU group information (Index 1).

In addition, the UE transmits, to the eNB, information about an RU group (Index 1) which simultaneously transmits RSs for self-interference measurement and long-term interference information (interference level X) between RUs (RU2 and RU3) in the RU group (Index 1) at Time 2. The eNB determines that FDR operation can be performed using RU2 and RU3 because the long-term self-interference information has been received with respect to the RU group information (Index 1).

Another example when the above-described technique is applied to signaling transmitted from a UE to an eNB is shown in Table 2. The UE delivers information in the form of a look-up table such as Table 2 to the eNB.

TABLE 2

Self-interference measurement RS transmission RU group information

| Index | RU group |
| --- | --- |
| 0 | RU1 |
| 1 | RU2, RU3, RU4 |

Long-term self-interference information in RU pair that does not require instantaneous self-interference measurement

| Intf level | RU pair |
| --- | --- |
| X1 | RU2, RU3 |
| X2 | RU2, RU4 |

The eNB considers that RU3 and RU4 cannot perform FDR

Table 2 shows an embodiment when the UE has four RUs. Here, RU2 to RU4 are RUs which simultaneously transmit RSs. Through the table, the eNB can recognize that self-interference measurement is necessary in RUs between RU group 1 (Index 0) and RU group 2 (Index 1) and RU2-RU3 and RU2-RU4 can perform FDR operation without instantaneous self-interference measurement. This is because the eNB has received long-term self-interference information X1 with respect to RU2-RU3 and long-term self-interference information X2 with respect to RU2-RU4.

In addition, RU3 and RU4 are considered to be unable to perform FDR operation because the eNB has not received long-term self-interference information with respect to RU2-RU4 from the UE. The strength of long-term self-interference between RU3 and RU4 may be equal to or greater than a threshold value.

When the above-described technique is used, bidirectional self-interference measurement and downlink channel quality measurement can be completed with a less number of transmissions.

Figure 24:
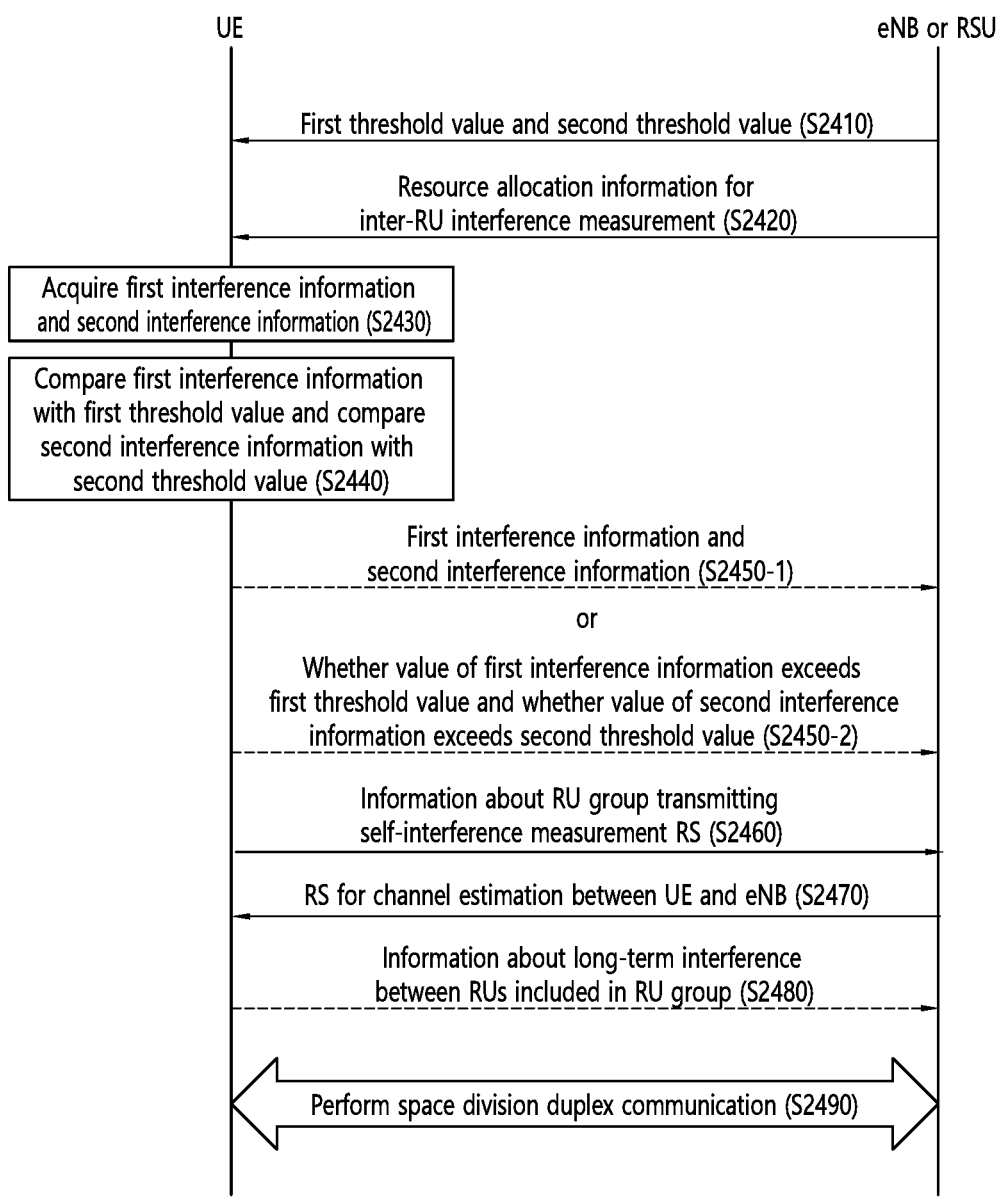
FIG. 24 illustrates a procedure of measuring inter-RU interference in order to perform space division duplex communication.

FIG. 24 illustrates a procedure of measuring inter-RU interference in order to perform space division duplex communication.

First, terms are arranged. A UE has a plurality of radio units (RUs) and an RU may correspond to an antenna port. In the present embodiment, space division duplex communication may correspond to communication through which one RU receives a signal and another RU transmits a signal or communication through which one RU transmits a signal and another RU receives a signal.

In step S2410, a UE may receive a first threshold value and a second threshold value from an eNB. The first threshold value and the second threshold value may be broadcast or transmitted through a radio resource control (RRC) message.

In step S2420, the UE may receive allocation information of resources for periodically measuring inter-RU interference from the eNB. Accordingly, the UE can measure inter-RU interference to generate interference information.

In step S2430, the UE acquires first interference information indicating the strength of inter-RU interference after analog interference cancellation and second interference information indicating the strength of inter-RU interference before analog interference cancellation.

In step S2440, the UE compares the first interference information with the first threshold value and compares the second interference information with the second threshold value.

Specifically, when the strength of interference indicated by the first interference information is greater than the first threshold value, the UE determines that space division duplex communication between RUs cannot be performed. When the strength of interference indicated by the first interference information is equal to or less than the first threshold value, the UE determines that space division duplex communication between RUs can be performed.

When it is determined that space division duplex communication between RUs can be performed, the UE periodically measures inter-RU interference in order to perform space division duplex communication between RUs if the strength of interference indicated by the second interference information is greater than the second threshold value. If the strength of interference indicated by the second interference information is equal to or less than the second threshold value, the UE does not periodically measure inter-RU interference for performing space division duplex communication between RUs.

That is, the UE determines whether space division duplex communication between RUs can be performed through the value of the first interference information and determines the necessity of periodic inter-RU interference measurement through the value of the second interference information.

In step S2450-1, the UE may transmit the first interference information and the second interference information to the eNB. When it is assumed that the UE has N RUs, the UE needs to transmit interference information about a total of $N(N-1)/2$ RU pairs and thus a large number of bits are required. If p bits are necessary for each piece of interference information, a total of $N(N-1)p$ bits are required.

Accordingly, the UE may transmit information representing whether the strength of interference indicated by the first interference information is greater than the first threshold value and whether the strength of interference indicated by the second interference information is greater than the second threshold value to the eNB in step S2450-2. Here, only 1-bit information is necessary for each RU pair, and thus information can be transmitted using only $N(N-1)$ bits. The UE may perform the procedure by selecting one of the technique of step S2450-1 and the technique of step S2450-2.

Further, channel estimation may be performed in simultaneous consideration of inter-RU self-interference in the UE and a signal transmitted from the eNB in the present embodiment. Hereinafter, inter-RU interference and inter-RU self-interference will be interchangeably described.

In step S2460, the UE may transmit information about an RU group which transmits a reference signal for periodically measuring the inter-RU interference to the eNB.

In step S2470, the UE may receive a reference signal for channel estimation between the UE and the eNB.

Here, the reference signal for periodically measuring the inter-RU interference may be transmitted from some RUs. The reference signal for performing channel estimation with respect to the eNB may be received by some other RUs. The reference signal for periodically measuring the inter-RU interference and the reference signal for performing channel estimation with respect to the eNB may be orthogonal to each other.

In step S2480, if the strength of inter-RU long-term interference included in the RU group information is equal to or less than the second threshold value, the UE may transmit the strength of inter-RU long-term interference included in the RU group information to the eNB. On the other hand, if the strength of inter-RU long-term interference included in the RU group information is greater than the second threshold value, the UE may not transmit the strength of inter-RU long-term interference included in the RU group information to the eNB.

That is, when the strength of inter-RU long-term interference included in the RU group information is transmitted to the eNB, space division duplex communication between RUs included in the RU group information can be performed (step S2490). When the strength of inter-RU long-term interference included in the RU group information is not transmitted to the eNB, space division duplex communication between RUs included in the RU group information may not be performed. That is, the eNB determines that space division duplex communication is not possible for RU pairs in an RU group from which information on the strength of long-term interference is not transmitted.

Further, when the strength of inter-RU long-term interference included in the RU group information is transmitted to the eNB, a modulation scheme, a channel code rate and resource allocation for transmitting signals using RUs included in the RU group information may be determined on the basis of the strength of inter-RU long-term interference included in the RU group information.

Hereinafter, the present description proposes an interface for generating RU information and delivering the RU information to a UE such that a baseband processor of the UE having a plurality of RUs can receive necessary information from RUs.

Referring to FIG. 11, a baseband processor is manufactured by a modem chip manufacturer and an RU is manufactured by a UE or vehicle manufacturer, in general. When a UE has a single RU and the RU omnidirectionally transmits and receives signals, the RU need not additionally transmit information to the baseband processor. However, if a UE has a plurality of RUs and each RU can transmit and receive signals only in a specific direction, RUs can perform communication more efficiently by transmitting characteristics thereof to the baseband processor. For example, a UE can broadcast or multicast different pieces of information in different directions through RUs. Further, when a specific RU has a trouble, it is possible to detect whether communication with the RU having a trouble cannot be performed more efficiently. When an interface is set between an RU and the baseband processor, the RU can be modularized.

Conventionally, researches on setting an interface between a remote radio head (RRH) and a base band unit (BBU) in a cloud network were conducted. However, an interface between an RU and a baseband processor in a UE was not defined. Further, an interface in a UE when an RU has an analog self-interference canceller was not discussed.

Accordingly, a Br interface which is an interface between a baseband processor and an RU will be defined in the following.

For example, when a UE modem is powered on, the baseband processor requests information transmission from an RU. The RU requested to transmit information generates RU information according to an interface appointed in advance and transmits the RU information to the baseband processor. In the present invention, the interface between the baseband processor and an RU is referred to as a Br interface.

Figure 25:
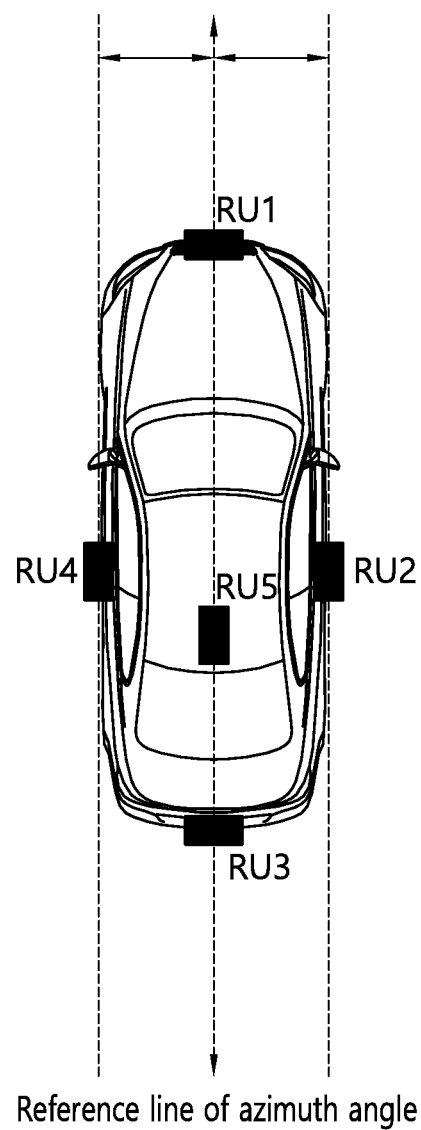
FIG. 25 shows a reference line of an azimuth angle of an RU.

FIG. 25 shows a reference line of an azimuth angle of an RU.

Information transmitted from an RU to the baseband processor can be configured as follows.

The RU transmits direction information of an antenna panel to the baseband processor through the Br interface. A reference point of an azimuth angle of the RU antenna panel is generated on the basis of a center line of the front direction of a vehicle and a reference point of an elevation angle is generated on the basis of a direction orthogonal to the sea level (the ground).

The azimuth angle and the elevation angle of the RU may be input to the RU by the manufacturer or generated using a gyro sensor included in the RU.

In the case of an omnidirectional antenna, the azimuth angle and the elevation angle are set to 0.

In the case of an omnidirectional antenna, it is difficult to set an antenna panel in a specific direction. Accordingly, the azimuth angle and the elevation angle of the antenna panel are set to 0 in the case of the omnidirectional antenna.

A bit N1 for representing the azimuth angle may differ from a bit N2 for representing the elevation angle. This is because the azimuth angle can have values up to 360 degrees whereas the elevation angle has values up to 180 degrees. For example, N1=2*N2.

The RU notifies the baseband processor of an antenna array gain of a main lobe and antenna gains of side lobes for each Rx chain. Here, the RU transmits only antenna gains of side lobes having antenna gain differences of less than x dB from that of the main lobe.

In addition, the RU transmits beam radiation pattern information in the vertical and horizontal directions to the baseband processor through the Br interface for each Rx chain.

The aforementioned embodiment is necessary to detect a range in which each RU can transmit and receive signals. For example, the aforementioned embodiment can be used to detect a range of intersection of beam radiation patterns between RU2 and RU3 in FIG. 25. If the intersection range between RU2 and RU3 is wide, an interference cancellation technique is required for RU2 to receive a signal and for RU3 to transmit a signal. Further, a range in which RU2 can cover the communication range of RU3 when RU3 has a trouble can be detected.

Information on the beam width of the main lobe is transmitted and information on the beam directions and beam widths of side lobes having antenna gain differences of less than x dB from that of the main lobe is transmitted.

Further, a 1-bit indicator indicating that the corresponding side lobes are symmetrical may be transmitted.

Since the beam direction of the main lobe is consistent with the direction of the antenna panel, only beam width information is transmitted with respect to the main lobe. Side lobes are generated in different directions according to the number and spacing of antennas and thus it is necessary to explicitly signal side lobe generation directions. Further, although side lobes are generated symmetrically in most cases, they may not be symmetrical occasionally. Accordingly, when side lobes are symmetrical, the amount of information can be reduced through the 1-bit indicator.

Each RU separately generates beam width information of the main lobe and beam direction and beam width information of side lobes as vertical direction information and horizontal direction information and transmits the information to the baseband processor.

When each RU has a plurality of antenna ports, main lobe information and side lobe information are signaled for each antenna port.

In addition, each RU informs the baseband processor of the number of antennas in the vertical direction, the number of antennas in the horizontal direction, an antenna spacing in the vertical direction and an antenna spacing in the horizontal direction instead of explicitly signaling beam width information of the main lobe and beam direction and beam width information of side lobes.

Further, each RU signals whether analog interference cancellation can be performed through the Br interface. In addition, each RU can transmit a maximum strength of interference which can be canceled by an analog interference canceler, a time taken to stabilize analog interference cancellation when channels change, and the like.

For example, a case in which interference from RU2 and RU4 is applied to RU3 of FIG. 25 is assumed. Here, when the UE intends to transmit a signal through RU2 or RU4 while receiving a signal from RU3, RU3 may have an analog interference cancellation function.

In addition, each RU transmits the number of Rx chains included therein to the baseband processor through the Br interface. The Br interface uses N3 bits in order to represent an Rx chain. Here, $N3=\text{ceil}(\log 2(N_{an}))$ when the maximum number of antenna ports supported by the physical layer is $N_{an}$.

A vehicle may have only one RU instead of a plurality of RUs. Accordingly, a single RU can support a maximum of $N_{an}$ antennas.

An RU can divide the number of Rx chains into the number of Tx units (TxU) and the number of Rx units (RxU) and transmit the resultant values to the baseband processor.

Further, the RU informs the baseband processor whether analog beamforming can be performed through the Br interface.

The RU needs to signal whether analog beamforming is performed because whether beam scanning subframes are introduced can be determined according to whether analog beamforming can be performed.

The RU transmits information about the antenna array gain of a main lobe and the antenna array gains of side lobes and beam radiation pattern information in the vertical and horizontal directions for each Rx chain through a reference beam and transmits horizontal and vertical resolution information of analog beams supported by the RU to the baseband processor.

Although the shapes of side lobes may slightly change according to analog beam radiation directions, the overall shapes do not change and thus phase shifter resolution information supported by analog beams on the basis of the reference beam is transmitted to the baseband processor.

In addition, an RU that performs analog beamforming can transmit information about the antenna array gain of a main lobe and antenna array gains of side lobes and beam radiation pattern information in the vertical and horizontal directions for each Rx chain for all analog beams.

An RU informs the baseband processor of information on the position thereof through the Br interface. For example, the RU can transmit information on the height thereof to the baseband processor.

Since channel characteristics and signal blocking probability change according to antenna height, it is necessary to inform the baseband processor of the corresponding information.

Further, when the baseband processor requests information transmission from an RU through the Br interface but there is no reply from the RU within a time $T_{max}$, the RU is determined to be an RU that does not have the analog interference cancellation function. Then, the baseband processor requests resources from an eNB. When the eNB allocates the resources, an uplink signal is transmitted to the corresponding RU. The UE determines that the RU does not support the Br interface when the UE receives a reply from the eNB and determines that the RU is damaged when the UE does not receive a reply from the eNB.

When an RU included in the UE does not support the Br interface, the RU cannot transmit a signal to the baseband processor as a reply. Further, when the RU is damaged, the RU also cannot transmit a signal through the Br interface as a response. To distinguish these two cases from each other, the UE can transmit a UL signal to the corresponding RU. Here, the signal transmitted by the UE may be dummy data or an uplink reference signal such as an SRS.

When dummy data is transmitted, the UE sends a request for uplink resources to the eNB through an SR and transmits the dummy data in the resources allocated by the eNB. Thereafter, the UE receives ACK/NACK for UL from the eNB. When the UE receives ACK, the corresponding RU is an RU that does not support the Br interface. When the UE does not receive ACK within a time T1, the corresponding RU can be determined to be a damaged RU. Here, ACK/NACK may be ACK/NACK of the physical layer or ACK/NACK of the RLC layer.

When an SRS is transmitted, the UE sends a request for resources for SRS transmission to the eNB. The eNB allocates SRS resources to the UE periodically or aperiodically. The UE expects a response signal to the SRS from the eNB. If a response signal from the eNB does not arrive within the time T1, the corresponding RU is regarded as a damaged RU. Here, the response signal may be generated as an L1, L2 or L3 signal. In 3GPP LTE communication system, the SRS is transmitted for the purpose of uplink estimation and the subject of scheduling is an eNB and thus a response signal to the SRS is not present. If SRS transmission is designated in order to detect presence or absence of an RU, the above-described procedure can be applied.

Figure 26:
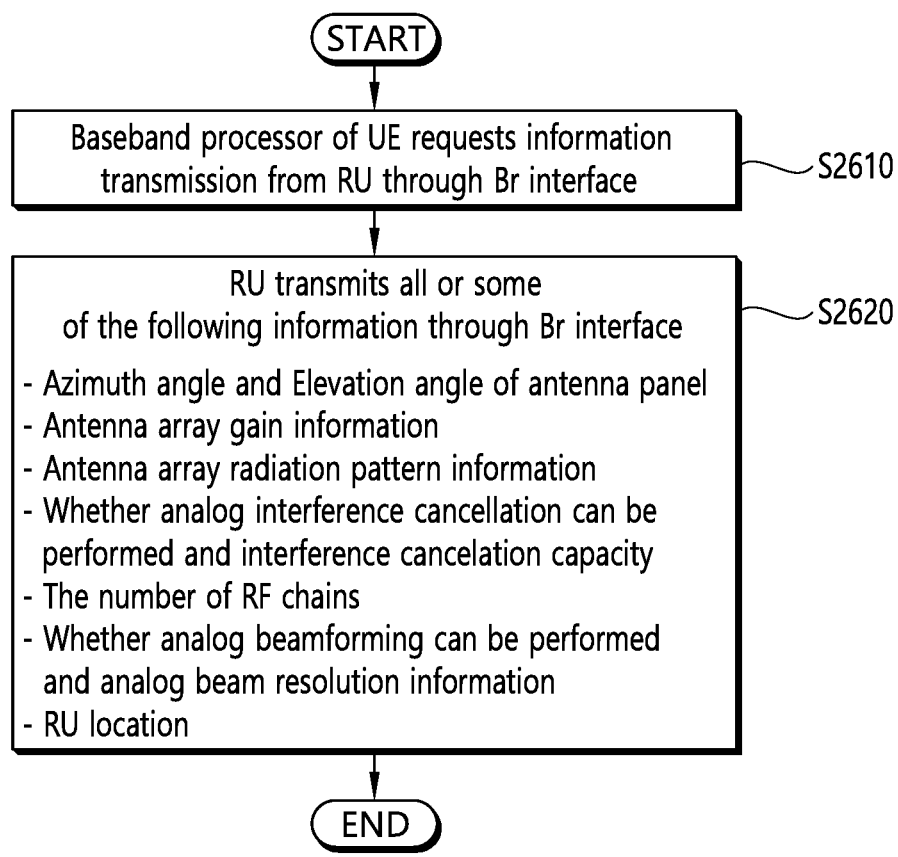
FIG. 26 is a flowchart showing a procedure of transmitting information by an RU to a baseband processor.

FIG. 26 is a flowchart of a procedure of transmitting information, by an RU, to a baseband processor.

In step S2610, a baseband processor of a UE requests information transmission from an RU through a Br interface.

In step S2620, the RU transmits all or some of the following information through the Br interface.

Azimuth angle and elevation angle of an antenna panel

Antenna array gain information

Antenna array radiation pattern information

Whether analog interference cancellation can be performed and interference cancelation capacity The number of RF chains Whether analog beamforming can be performed and analog beam resolution information RU location When the proposed technique is used, the RU can transmit information thereof to the baseband processor of the UE. Accordingly, the UE can perform signal broadcasting/multicasting in a specific direction. Further, it is possible to flexibly cope with a damaged RU. In addition, it is possible to improve efficiency in various manners during communication.

Figure 27:
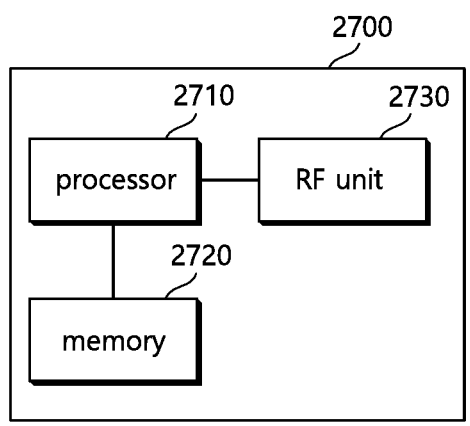
FIG. 27 is a block diagram of an apparatus realizing an embodiment of the present description.

FIG. 27 is a block diagram showing an apparatus for wireless communication for implementing an embodiment of the present invention.

An apparatus 2700 for wireless communication includes a processor 2710, a memory 2720 and a radio frequency (RF) unit 2730.

The processor 2710 may be configured to implement proposed functions, procedures and/or methods described in this description. Layers of the radio interface protocol may be implemented in the processor 2710. The processor 2710 may handle a procedure explained above. The memory 2720 is operatively coupled with the processor 2710, and the RF unit 2730 is operatively coupled with the processor 2710.

The processor 2710 may include application-specific integrated circuit (ASIC), other chipset, logic circuit and/or data processing device. The memory 2720 may include read-only memory (ROM), random access memory (RAM), flash memory, memory card, storage medium and/or other storage device. The RF unit 2730 may include baseband circuitry to process radio frequency signals. When the embodiments are implemented in software, the techniques described herein can be implemented with modules (e.g., procedures, functions, and so on) that perform the functions described herein. The modules can be stored in memory 2720 and executed by processor 2710. The memory 2720 can be implemented within the processor 2710 or external to the processor 2710 in which case those can be communicatively coupled to the processor 2710 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method for measuring inter-RU interference, by a UE having a plurality of radio units (RUs), in order to perform space division duplex communication, the method comprising:

acquiring first interference information indicating the strength of inter-RU interference after analog interference cancellation and second interference information indicating the strength of inter-RU interference before analog interference cancellation;

when the strength of interference indicated by the first interference information is greater than a first threshold value, determining that space division duplex communication between RUs cannot be performed;

when the strength of interference indicated by the first interference information is equal to or less than the first threshold value, determining that space division duplex communication between RUs can be performed, periodically measuring inter-RU interference for performing the space division duplex communication between RUs when the strength of interference indicated by the second interference information is greater than a second threshold value; and not periodically measuring inter-RU interference for performing the space division duplex communication between RUs when the strength of interference indicated by the second interference information is equal to or less than the second threshold value, wherein the RUs correspond to antenna ports.

2. The method of claim 1, wherein the space division duplex communication between RUs is communication through which one RU receives a signal and another RU transmits a signal or communication through which one RU transmits a signal and another RU receives a signal.

3. The method of claim 1, further comprising transmitting the first interference information and the second interference information to an eNB.

4. The method of claim 1, further comprising:

receiving the first threshold value and the second threshold value from an eNB; and receiving information on allocation of resources for periodically measuring the inter-RU interference from the eNB, wherein the first threshold value and the second threshold value are broadcast or transmitted through a radio resource control (RRC) message.

5. The method of claim 4, further comprising transmitting information representing whether the strength of interference indicated by the first interference information is greater than the first threshold value and whether the strength of interference indicated by the second interference information is greater than the second threshold value to the eNB.

6. The method of claim 1, further comprising:

transmitting, to an eNB, information about an RU group that transmits a reference signal for periodically measuring the inter-RU interference;

transmitting the strength of inter-RU long-term interference included in the RU group information to the eNB if the strength of the inter-RU long-term interference included in the RU group information is equal to or less than the second threshold value; and not transmitting the strength of the inter-RU long-term interference included in the RU group information to the eNB if the strength of the inter-RU long-term interference included in the RU group information is greater than the second threshold value.

7. The method of claim 6, wherein space division duplex communication between RUs included in the RU group information is performed if the strength of the inter-RU long-term interference included in the RU group information is transmitted to the eNB, and space division duplex communication between RUs included in the RU group information is not performed if the strength of the inter-RU long-term interference included in the RU group information is not transmitted to the eNB.

8. The method of claim 6, wherein, if the strength of the inter-RU long-term interference included in the RU group information is transmitted to the eNB, a modulation scheme, a channel code rate and resource allocation for transmitting signals using an RU included in the RU group information are determined on the basis of the strength of the inter-RU long-term interference included in the RU group information.

9. The method of claim 6, wherein the reference signal for periodically measuring the inter-RU interference is transmitted from some RUs, a reference signal for performing channel estimation with respect to the eNB is received by some other RUs, and the reference signal for periodically measuring the inter-RU interference and the reference signal for performing channel estimation with respect to the eNB are orthogonal to each other.

10. A UE for measuring inter-RU interference in order to perform space division duplex communication, the UE comprising:
    a radio frequency (RF) unit configured to transmit and receive RF signals; and
    a processor connected to the RF unit,
    wherein the processor is configured:
    to acquire first interference information indicating the strength of inter-RU interference after analog interference cancellation and second interference information indicating the strength of inter-RU interference before analog interference cancellation;
    when the strength of interference indicated by the first interference information is greater than a first threshold value, to determine that space division duplex communication between RUs cannot be performed;
    when the strength of interference indicated by the first interference information is equal to or less than the first threshold value, to determine that space division duplex communication between RUs can be performed,
        to periodically measure inter-RU interference for performing the space division duplex communication between RUs when the strength of interference indicated by the second interference information is greater than a second threshold value; and
        not to periodically measure inter-RU interference for performing the space division duplex communication between RUs when the strength of interference indicated by the second interference information is equal to or less than the second threshold value,
    wherein the RUs correspond to antenna ports, and the UE has a plurality of RUs.

11. The UE of claim 10, wherein the space division duplex communication between RUs is communication through which one RU receives a signal and another RU transmits a signal or communication through which one RU transmits a signal and another RU receives a signal.

12. The UE of claim 10, wherein the processor transmits the first interference information and the second interference information to an eNB.

13. The UE of claim 10, wherein the processor receives the first threshold value and the second threshold value from an eNB and receives information on allocation of resources for periodically measuring the inter-RU interference from the eNB,
    wherein the first threshold value and the second threshold value are broadcast or transmitted through a radio resource control (RRC) message.

14. The UE of claim 13, wherein the processor transmits information representing whether the strength of interference indicated by the first interference information is greater than the first threshold value and whether the strength of interference indicated by the second interference information is greater than the second threshold value to the eNB.

15. The UE of claim 10, wherein the processor transmits, to an eNB, information about an RU group that transmits a reference signal for periodically measuring the inter-RU interference, transmits the strength of inter-RU long-term interference included in the RU group information to the eNB if the strength of the inter-RU long-term interference included in the RU group information is equal to or less than the second threshold value, and does not transmit the strength of the inter-RU long-term interference included in the RU group information to the eNB if the strength of the inter-RU long-term interference included in the RU group information is greater than the second threshold value.

16. The UE of claim 15, wherein space division duplex communication between RUs included in the RU group information is performed if the strength of the inter-RU long-term interference included in the RU group information is transmitted to the eNB, and space division duplex communication between RUs included in the RU group information is not performed if the strength of the inter-RU long-term interference included in the RU group information is not transmitted to the eNB.

17. The UE of claim 15, wherein, if the strength of the inter-RU long-term interference included in the RU group information is transmitted to the eNB, a modulation scheme, a channel code rate and resource allocation for transmitting signals using an RU included in the RU group information are determined on the basis of the strength of the inter-RU long-term interference included in the RU group information.

18. The UE of claim 15, wherein the reference signal for periodically measuring the inter-RU interference is transmitted from some RUs, a reference signal for performing channel estimation with respect to the eNB is received by some other RUs, and the reference signal for periodically measuring the inter-RU interference and the reference signal for performing channel estimation with respect to the eNB are orthogonal to each other.

* * * * *